United States Patent
Lee et al.

(10) Patent No.: US 10,264,626 B2
(45) Date of Patent: Apr. 16, 2019

(54) VIRTUALIZED WIRELESS NETWORK

(71) Applicant: Dali Systems Co. Ltd., George Town, Grand Cayman (KY)

(72) Inventors: Albert S. Lee, Palo Alto, CA (US); Shawn Patrick Stapleton, Palo Alto, CA (US); Paul Lemson, Palo Alto, CA (US); Gary Spedaliere, Palo Alto, CA (US)

(73) Assignee: Dali Systems Co. Ltd., George Town (KY)

( * ) Notice: Subject to any disclaimer, the term of this patent is extended or adjusted under 35 U.S.C. 154(b) by 0 days.

(21) Appl. No.: 13/670,290

(22) Filed: Nov. 6, 2012

(65) Prior Publication Data
US 2013/0128810 A1 May 23, 2013

Related U.S. Application Data

(60) Provisional application No. 61/556,715, filed on Nov. 7, 2011.

(51) Int. Cl.
*H04W 84/04* (2009.01)
*H04W 88/08* (2009.01)
(Continued)

(52) U.S. Cl.
CPC .......... *H04W 84/042* (2013.01); *H04W 4/70* (2018.02); *H04W 88/085* (2013.01); *H04W 4/90* (2018.02); *H04W 84/047* (2013.01); *H04W 88/08* (2013.01)

(58) Field of Classification Search
CPC ... H04W 88/085; H04W 88/08; H04W 88/04; H04W 88/12; H04W 84/047;
(Continued)

(56) References Cited

U.S. PATENT DOCUMENTS 6,075,989 A 6/2000 Moore et al.
6,161,024 A 12/2000 Komara
(Continued)

FOREIGN PATENT DOCUMENTS

CN 1559153 A 12/2004
JP 05-344048 A 10/1993
(Continued)

OTHER PUBLICATIONS

Notification of Transmittal of the International Search Report and the Written Opinion of the International Searching Authority, or the Declaration; International Search Report and Written Opinion of the International Searching Authority for corresponding International application No. PCT/US2012/063720 dated Jan. 29, 2013, 8 pages.
(Continued)

*Primary Examiner* — Rownak Islam
(74) *Attorney, Agent, or Firm* — Kilpatrickt Townsend & Stockton LLP

(57) ABSTRACT

According to an embodiment of the present invention, a network is provided. The network may include a first base transceiver station (BTS). The first BTS may be operable to provide a first signal including a plurality of first carriers. The network may also include a second BTS operable to provide a second signal including a plurality of second carriers. The network may also include a set of one or more digital access units (DAUs), each of the one or more DAUs being coupled to at least one of the first BTS or the second BTS. A set of one or more digital remote units (DRUs) may be included in the network, each of the DRUs being coupled to one of the one or more DAUs and operable to broadcast the first signal or the second signal.

20 Claims, 15 Drawing Sheets

Flexible Simulcast Downlink Example

(51) Int. Cl.
*H04W 4/70* (2018.01)
*H04W 4/90* (2018.01)

(58) Field of Classification Search
CPC . H04W 84/045; H04W 84/042; H04W 4/005; H04W 4/22; H04W 84/00; H04W 88/14; H04W 4/70; H04W 4/90
USPC .... 370/228, 328, 310, 310.2, 329, 254, 330, 370/270, 315, 312, 252; 455/422.1, 453, 455/466, 561, 562
See application file for complete search history.

(56) References Cited

U.S. PATENT DOCUMENTS

| | | | |
|---|---|---|---|
| 6,801,767 B1* | 10/2004 | Schwartz | H04B 10/25755 398/115 |
| 7,565,170 B2* | 7/2009 | Buscaglia et al. | 455/561 |
| 7,664,534 B1 | 2/2010 | Johnson | |
| 8,355,313 B2 | 1/2013 | Walton et al. | |
| 8,583,100 B2* | 11/2013 | Koziy et al. | 455/422.1 |
| 8,682,338 B2 | 3/2014 | Lemson et al. | |
| 8,737,300 B2 | 5/2014 | Stapleton et al. | |
| 9,026,036 B2 | 5/2015 | Saban et al. | |
| 2002/0186436 A1 | 12/2002 | Mani et al. | |
| 2003/0078052 A1 | 4/2003 | Atias et al. | |
| 2003/0134644 A1 | 7/2003 | Reed et al. | |
| 2004/0004943 A1 | 1/2004 | Kim et al. | |
| 2004/0132474 A1 | 7/2004 | Wala | |
| 2005/0088992 A1 | 4/2005 | Bolin et al. | |
| 2006/0089165 A1 | 4/2006 | Smith et al. | |
| 2007/0243899 A1 | 10/2007 | Hermel et al. | |
| 2008/0119198 A1* | 5/2008 | Hettstedt et al. | 455/453 |
| 2009/0180426 A1* | 7/2009 | Sabat | H04W 88/085 370/328 |
| 2009/0258652 A1 | 10/2009 | Lambert et al. | |
| 2009/0316608 A1* | 12/2009 | Singh | H04W 88/085 370/280 |
| 2010/0278530 A1* | 11/2010 | Kummetz | H04W 88/085 398/41 |
| 2010/0296458 A1* | 11/2010 | Wala | H04B 1/707 370/329 |
| 2010/0296469 A1 | 11/2010 | Zhou et al. | |
| 2011/0135308 A1 | 6/2011 | Tarlazzi et al. | |
| 2011/0158332 A1* | 6/2011 | Wu et al. | 375/259 |
| 2012/0071184 A1* | 3/2012 | Lin | H04W 88/10 455/507 |
| 2012/0177026 A1* | 7/2012 | Uyehara | H04B 1/18 370/345 |
| 2012/0189074 A1* | 7/2012 | Jin | H04B 7/024 375/267 |
| 2012/0257516 A1* | 10/2012 | Pazhyannur | H04B 7/024 370/252 |
| 2013/0094425 A1* | 4/2013 | Soriaga | H04W 88/085 370/312 |
| 2013/0114486 A1 | 5/2013 | Spedaliere et al. | |
| 2013/0150063 A1* | 6/2013 | Berlin | H04B 10/25758 455/450 |
| 2017/0054476 A1 | 2/2017 | Spedaliere et al. | |

FOREIGN PATENT DOCUMENTS

| | | | | |
|---|---|---|---|---|
| JP | 2007-529926 | | 10/2007 | |
| WO | 1996/27269 A1 | | 9/1996 | |
| WO | 2010/091004 A1 | | 8/2000 | |
| WO | 2010090999 A1 | | 8/2010 | |
| WO | WO 2010139112 A1 * | | 12/2010 | H04W 16/02 |
| WO | WO 2013/070613 A1 | | 5/2013 | |

OTHER PUBLICATIONS

Supplemental European Search Report, dated Jun. 25, 2015, for European Patent Application 12 848 304, 9 pages.
First Examination Report for Australian Patent Application No. 2012336026 dated Mar. 10, 2016, 4 pages.
Office Action for Eurasian Patent Application No. 201400555 dated Dec. 10, 2015, 4 pages.
Office Action for Japanese patent application No. P2014-540194, dated Aug. 2, 2016, 13 pages.
Office Action for Chinese Patent Application No. 201280066289.6 dated May 31, 2017, 7 pages.
Japanese Patent Application No. 2017-113169 , "Office Action", dated May 21, 2018, 13 pages.
U.S. Appl. No. 15/857,356, "Non-Final Office Action", dated Aug. 27, 2018, 32 pages.

* cited by examiner

Remote Radio Head Unit

Indoor Localization System of GSM and LTE

Indoor or Outdoor Localization System

VIRTUALIZED WIRELESS NETWORK

CROSS-REFERENCES TO RELATED APPLICATIONS

This application claims priority to U.S. Provisional Patent Application No. 61/556,715, filed on Nov. 7, 2011, titled "Virtualized Wireless Network," the disclosure of which is hereby incorporated by reference in its entirety for all purposes.

BACKGROUND OF THE INVENTION

The proliferation of Internet-enabled smart phones and mobile devices have driven wireless subscribers to consume an unprecedented amount of multimedia and multimodal mobile data traffic, such as real-time video streaming, high definition movies downloading, and the like. This explosion has been augmented by machine-to-machine (M2M) type real-time applications, such as utility-meter monitoring, that operate autonomously and independently from user transactions. Such advances have resulted in exponential growth of the demand for mobile data capacity on a global scale, challenging traditional cellular networks. Yet, the supply of mobile data capacity provided by existing radio network solutions may only be growing linearly. Therefore, there may be a need to address the gap between supply and demand for mobile data capacity as the gap is rapidly widening.

SUMMARY OF THE INVENTION

These and other problems may be addressed by embodiments of the present invention. The present invention relates to wireless communication systems. More particularly, the present invention provides methods and systems related to a virtualized wireless network.

According to embodiments of the present invention, the virtualization of a wireless network is provided utilizing software configurable radio-based distributed antenna system (DAS). As described herein, embodiments of the present invention enable wireless network operators to virtualize their base station farms or hotels (allowing the operators to mix-and-match base stations from different OEM vendors) and to provide on demand wireless capacity and coverage in an anywhere/anytime format. As a result, embodiments of the present invention enable increased efficiency and utilization of new and existing assets that fundamentally change the manner in which operators are able to plan and deploy their wireless networks.

According to an embodiment of the present invention, a network is provided. The network may include a first base transceiver station (BTS). The first BTS may be operable to provide a first signal including a plurality of first carriers. The network may also include a second BTS operable to provide a second signal including a plurality of second carriers. The network may also include a set of one or more digital access units (DAUs), each of the one or more DAUs being coupled to at least one of the first BTS or the second BTS. A set of one or more digital remote units (DRUs) may be included in the network, each of the DRUs being coupled to one of the one or more DAUs and operable to broadcast the first signal or the second signal.

In some embodiments, the first BTS may be associated with a first infrastructure supplier and the second BTS may be associated with a second infrastructure supplier. In some embodiments, the first infrastructure supplier and the second infrastructure supplier are a same infrastructure supplier.

The one or more BTSs may provide the signal including the plurality of carriers using differing broadcast protocols. The different broadcast protocols may include at least one of CDMA, WCDMA, or LTE. The one or more DAUs may include a plurality of DAUs coupled via at least one of Ethernet cable, Optical Fiber, Microwave Line of Sight Link, Wireless Link, or Satellite Link. The one or more DAUs may include a plurality of DAUs coupled to the plurality of DRUs via at least one of Ethernet cable, Optical Fiber, Microwave Line of Sight Link, Wireless Link, or Satellite Link. The one or more DRUs may include a plurality of DRUs connected in a daisy chain configuration and/or a star configuration. Each of the one or more DAUs may be coupled to at least one of the first BTS or the second BTS, e.g., via at least one of a Ethernet cable, Optical Fiber, Microwave Line of Sight Link, Wireless Link, or Satellite Link.

In some embodiments of the invention, a method of operating a virtual DAS network is provided. The method may include: receiving a first signal including a first plurality of carriers from a first BTS; receiving a second signal including a second plurality of carriers from a second BTS; routing the first and second signals to a first DRU; and routing the first and second signals to a second DRU. The method may further include: associating the first and second signals with one of a plurality of DRUs based on a geographic usage pattern, the plurality of DRUs comprising the first DRU and the second DRU. Routing the first and second signals to the second DRU may include routing the first second signals through a plurality of DAUs.

In some embodiments of the invention, a method of operating a virtual DAS network is provided. The method may include: receiving a first signal from a first BTS; receiving a second signal from a second BTS; routing the first signal to a first DRU; routing the second signal to a second DRU; receiving a third signal from the first BTS; and routing the third signal to the second DRU. The method may further include: repeatedly assigning the first DRU to one of a plurality of BTSs, the plurality of BTSs including the first BTS and the second BTS. The first DRU may be assigned at least partly in an attempt to evenly distribute combined BTS resources across DRUs in the network. Routing the third signal to the second DRU may include: routing the third signal through a plurality of DAUs.

DETAILED DESCRIPTION OF THE INVENTION

Figures 1A, 1B:
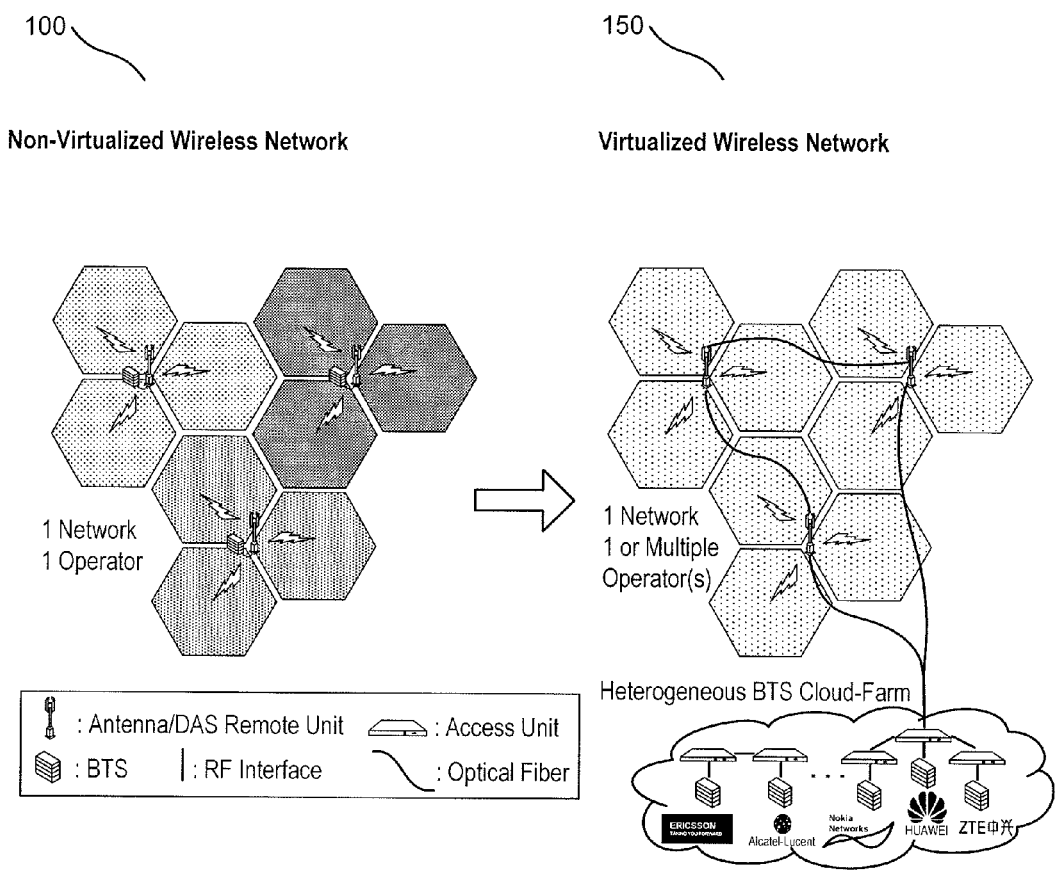
FIGS. 1A and 1B illustrate two types of wireless networks: a non-virtualized wireless network and a virtualized wireless network according to an embodiment of the present invention.

Embodiments of the present invention generally relate to wireless communication systems employing Distributed Antenna System (DAS) as part of a virtualized wireless network. More specifically, embodiments of the present invention relate to a wireless network that utilizes virtualization technology provided by software configurable radio (SCR) (which may also be referred to as a software defined radio (SDR)) DAS, as presented in U.S. patent application Ser. No. 13/211,236 (DW-1022U), filed Aug. 16, 2011, entitled Neutral Host Architecture for a Distributed Antenna System, and U.S. patent application Ser. No. 13/211,243 (DW-1023U), filed Aug. 16, 2011, entitled Remotely Reconfigurable Distributed Antenna System and Methods, the disclosures of which are hereby incorporated by reference in their entireties.

The proliferation of Internet-enabled smart phones and mobile devices have driven wireless subscribers to consume an unprecedented amount of multimedia and multimodal mobile data traffic, such as real-time video streaming, high definition movies downloading, and the like. This explosion is augmented by machine-to-machine (M2M) type real-time applications, such as utility-meter monitoring, that operate autonomously and independently from user transactions. This exponential growth of the demand for mobile data capacity on a global scale is challenging traditional cellular networks. The supply of mobile data capacity provided by existing radio network solutions is only growing linearly. Therefore, the gap between supply and demand for mobile data capacity is rapidly widening.

Wireless network operators currently over-provision wireless capacity in order to accommodate peak-time period usage. For example, a football stadium is normally empty most of the time. When a game or match is on, the same football stadium may have tens of thousands of attendees, and those attendees are likely to have smart phones with which they communicate with friends and family throughout the match, and in other cases, watch online instant replays on their mobile devices. Another example of variable bandwidth demand is rush hour traffic. A popular highway or freeway is usually deserted during non-peak hours (e.g., during the early morning hours). When peak traffic hours arrive (e.g., 8 a.m. or 5 p.m. for most U.S. cities), many vehicles are traveling on the busy highway or freeway. In situations where a significant number of drivers and/or passengers of the vehicles engaged in the rush hour use their cell phones for communications, bandwidth demand increases. Yet another example of variable bandwidth demand is bandwidth use within an office building or shopping mall. During regular office hours, an office-building cafeteria and/or mall food court may have little foot traffic (e.g., and relatively small bandwidth demand). However, during lunch hours, many customers may congregate in the cafeteria and/or food court and there will likely be a parallel surge of mobile data traffic. In all the above examples, wireless network operators may attempt to ensure that cell sites covering the stadiums, highways or freeways, and/or cafeterias or food courts have sufficient wireless capacities to handle the peak usage time period. With conventional wireless or radio frequency (RF) equipment, in which a base station is tied to a fixed or limited amount of capacity and a specific coverage area of a cell site, wireless network operators typically over-provision their cell sites to handle peak demand.

Over-provisioning results in wasted excess capacity during low usage time periods. In addition, the amount of over-provisioning needed at any particular cell site is difficult to gauge, and is in constant flux. If demand for mobile capacity outweighs supply at a particular cell site, then under-provisioning occurs. Under-provisioning may lead to degradation of service, large latency, service interruptions or dropped calls.

The current exponential growth of demand for mobile data capacity results in a need for exponential over-provisioning for many wireless network operators. Even if an operator had an exponential growth in capital to build capacity supply, there are physical limitations that may prevent exponential growth in installations of conventional wireless equipment such as physical space, municipality zoning requirements, power availability, and the like.

Embodiments of the present invention provide solutions to the widening gap discussed above with game-changing SCR technologies for broadband mobile networks. SCR may comprise a complex interplay of digital signal processing (DSP) algorithms, RF technologies, intelligent network protocols, and system architectures. SCR-based distributed antenna systems (DAS) and small cell solutions may impact the user experience for wireless operators, enterprises and end users. In particular, the virtualization technology described herein may enable massive, scalable broadband data throughput while providing efficiency, flexibility, and control that is unparalleled in the wireless infrastructure industry. The increased efficiency and utilization of new and existing assets may fundamentally change the way operators plan and deploy their wireless networks.

Embodiments of the present invention provide a flexible, cloud-like architecture not available using conventional systems. FIGS. 1A and 1B illustrate two types of wireless networks: a non-virtualized wireless network 100 and a virtualized wireless network 150. Referring to FIG. 1A, in the non-virtualized wireless network 100, base station hotels merely co-locate conventional systems together in the same locations. BTS equipment inside base station hotels may have limited, if any, interoperability among different BTS OEM vendors. For example, BTS OEM vendors may have architected their BTS equipment to work mostly with their own kind because of technical issues and/or economic motivations. From a technical viewpoint, BTS have sophisticated management and control signals that are proprietary to a particular OEM, and so BTS interoperability among different BTS OEM vendors may be difficult to achieve. Some BTS OEM vendors would claim that their BTS equipment had virtualization features, but a closer look may reveal that such claimed virtualization only occur within similar systems of the same vendor. From the economic side, BTS OEM may be incentivized to monopolize or "lock-up" as many operator customers as possible and therefore BTS OEM vendors have historically demonstrated strong resistance and reluctance to make their BTS architecture a true open standard. For example, vendors may sell BTS equipment initial at substantial discounts to wireless operators, though they may then later make substantial economic benefits against their operator customers by charging a premium on service agreements or upgrades. BTS equipment used in conjunction with conventional DAS system in a base station hotel may provide some form of joint-operation on the conventional DAS network, but again the BTS's of different OEM vendors are not interoperable with respect to each other.

Referring to FIG. 1B, a virtualized wireless network 150 may include a base station "farm" in which base stations are provisioned in a novel way, enabling underlying BTS hardware to be commoditized and used in a freely interoperable and scalable configurations. As described herein, embodiments of the present invention may enable the mix-and-match usage of base station from different OEM vendors. RF outputs of each BTS may be subject to rigorous industry standard. However, virtualized wireless networks may include one or more DAUs connected to one or more BTSs, such that the DAUs receive standard RF output of the BTSs. Thus, the DAUs may connect to BTSs from any OEM vendor, and BTSs from any OEM vendor can thus be added heterogeneously to the network, forming a basis of a base station farm. Similarly, DAUs may connect to one or more BTSs which provide a signal including a plurality of carriers using different broadcast protocols (e.g., CDMA, WCDMA or LTE). Also, due to the novel SCR-based architecture of the DAS network, all BTS from any BTS OEM vendors can supply capacity resources interoperable to the same network. Thus, embodiments of the present invention may provide a form of true virtualization not available using conventional systems. Embodiments of the present invention may provide for virtualization of base station farms to harness massive, scalable capacity resources. Some embodiments of the present invention are applicable in relation to mixed-mode air-interfaces in which LTE is included as one of the carriers (along with a mix of other signals such as WCDMA).

As described herein, virtualization of wireless network may provide significant benefits to wireless operators.: For example, multiple BTSs can be pooled into one or more BTS farms. This may vastly simplify network management and maintenance. Since each BTS in a conventional wireless network may be provisioned inflexibly to a particular coverage area, virtualization as disclosed herein may eliminate one-to-one dependency between a BTS and an associated fixed coverage area. Instead, each BTS can be flexibility provisioned for a large number of DRUs on a virtual DAS network at any time. If coverage is needed for a new area, additional DRUs can easily be added and configured to the existing virtual DAS network at the new area for the new coverage. This virtualization scheme may ensure provisioning of highest capacity availability and performance, while at the same time increasing efficiency, utilization, and flexibility of existing assets since BTS equipment can be recycled anytime, anywhere on the virtual DAS network. All these benefits could result in a substantial reduction in wireless operators' capital expenditures and operating expenses.

Figure 2:
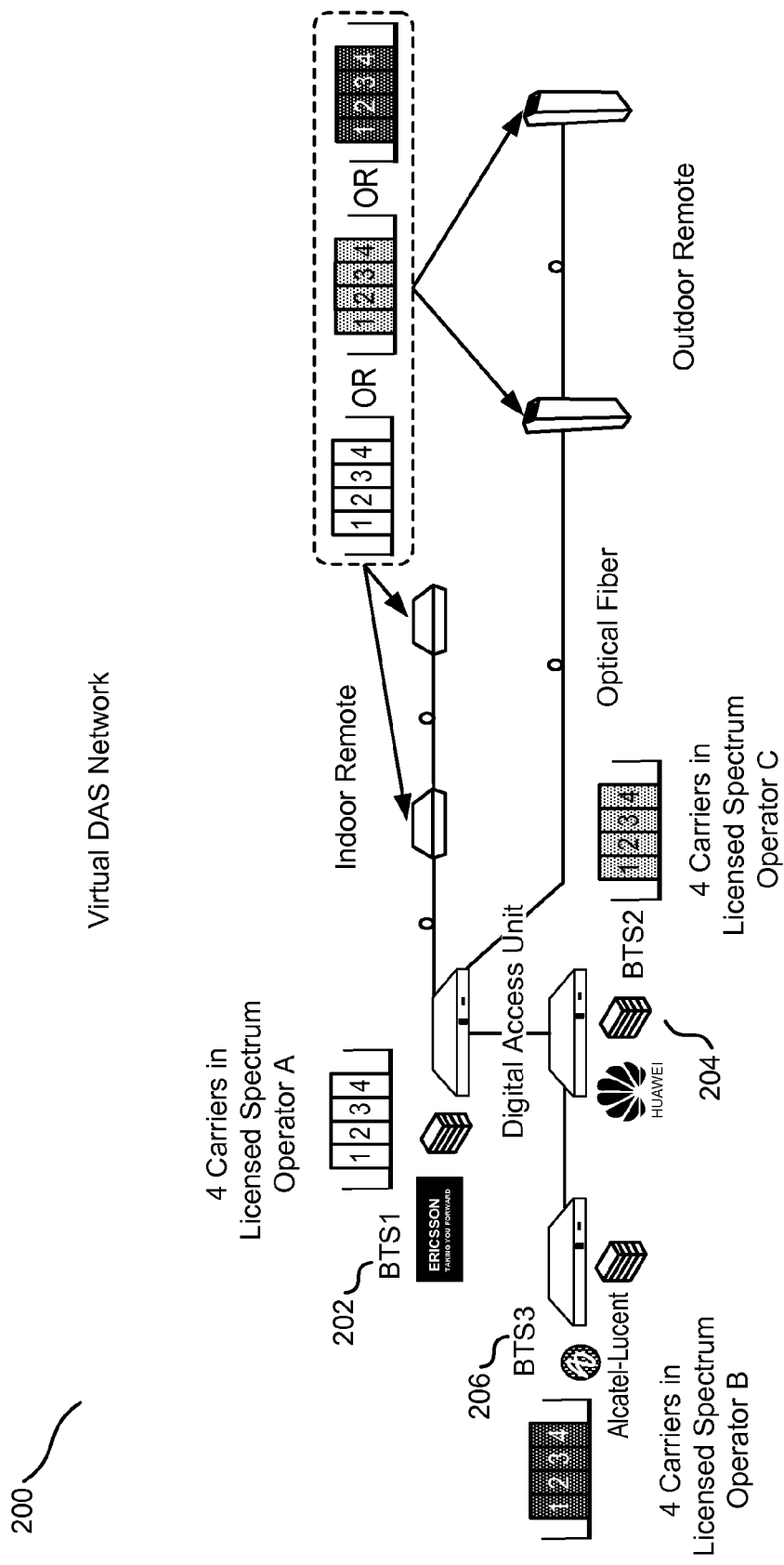
FIG. 2 is a simplified schematic diagram of a virtual DAS network according to an embodiment of the present invention.

FIG. 2 is a simplified schematic diagram 200 of a virtual DAS network according to some embodiments. As illustrated in FIG. 2, a plurality of BTSs (BTS1 202, BTS2 204, and BTS3 206) are provided in a BTS farm. In the illustrated embodiment, each BTS is coupled to a DAU, although in some embodiments, multiple BTSs can be coupled to each DAU. The plurality of BTSs can be associated with different operators and utilize different carriers in different spectral bands. In the illustrated embodiment, the present disclosure enables the virtualization of wireless network for the broadcast type air interface technologies, such as CDMA, WCDMA, LTE, or other suitable standards (the "Broadcast Case"). The DAUs are networked together, as presented in U.S. patent application Ser. No. 13/211,247 (DW-1024U), filed Aug. 16, 2011, titled "Daisy Chained Ring of Remote Units for a Distributed Antenna System," the disclosure of which is hereby incorporated by reference in its entirety, using suitable connection technologies including Ethernet, optical fiber, microwave links, or the like. In the Broadcast Case, all carriers of a specific BTS may be or must be present or "powered-on" simultaneously at any particular DRU. Capacity may then be controlled by adjusting the number of DRUs at any of the BTS in the BTS farm is corresponded. For example, referring to FIG. 2, the capacity resources of BTS 1 202, BTS 2 204, or BTS 3 206 can be shared across all four DRUs in the virtual DAS network. The capacity resources of the three BTSs 202, 204, and 206 can be mixed and matched among the four DRUs, but each of the DRUs in the illustrated embodiment must be exclusively powered by one of the 3 BTSs. If more capacity is demanded at any of the four DRUs, one of the BTSs can concentrate some or all of its capacity resources to that particular DRU by either, e.g.,: (i) becoming inactive on one, two, or three of the other DRUs, and thereby focusing the BTS's capacity resources onto that particular DRU, or (ii) adding a new BTS 4 (not shown) onto the BTS farm, and have that BTS 4 focus on powering the particular DRU. This example is illustrative and is evident that one skill in the art can vary the capacity resources configuration to achieve desirable results.

In one embodiment, the present disclosure enables the virtualization of wireless network for a channelized case, such as GSM (the "Channelized Case"), through control of individual channels, or Flexible Simulcast, as presented in U.S. patent application Ser. No. 13/211,243 (DW-1023U), filed Aug. 16, 2011, titled "Remotely Reconfigurable Distributed Antenna System and Methods," the disclosure of which is hereby incorporated by reference in its entirety.

Referring to FIG. 2, non-virtualized wireless networks may be characterized by a number of criteria and limitations. In a typical non-virtualized wireless network, one wireless operator builds a wireless network for its own exclusive use. Each BTS on the wireless network covers a fixed cell area, and over-provisioning is needed to accommodate peak time traffic. Wireless operators would need to add BTS with more capacity. This is a non-scalable approach.

Embodiments of the present invention provide a virtualized wireless network that is characterized by a number of benefits and improvements over conventional systems. For example, a virtualized wireless network such as one disclosed herein may allow one wireless network to serve one wireless operator exclusively or the same wireless network to serve multiple wireless operators, as in a "neutral host" environment. Further, since all heterogeneous BTSs in the BTS farm or cloud-farm need not be fixed to any particular cell site (as in the case of conventional wireless network), each of the BTS in the farm or cloud-farm can provide capacity and coverage to one of the multiple configurable areas where a suitable DRU is located. As a result, unlimited capacity can, in theory, be harnessed from the BTS farm or cloud-farm to the virtualized wireless network. This is a novel and highly scalable approach.

Figure 3:
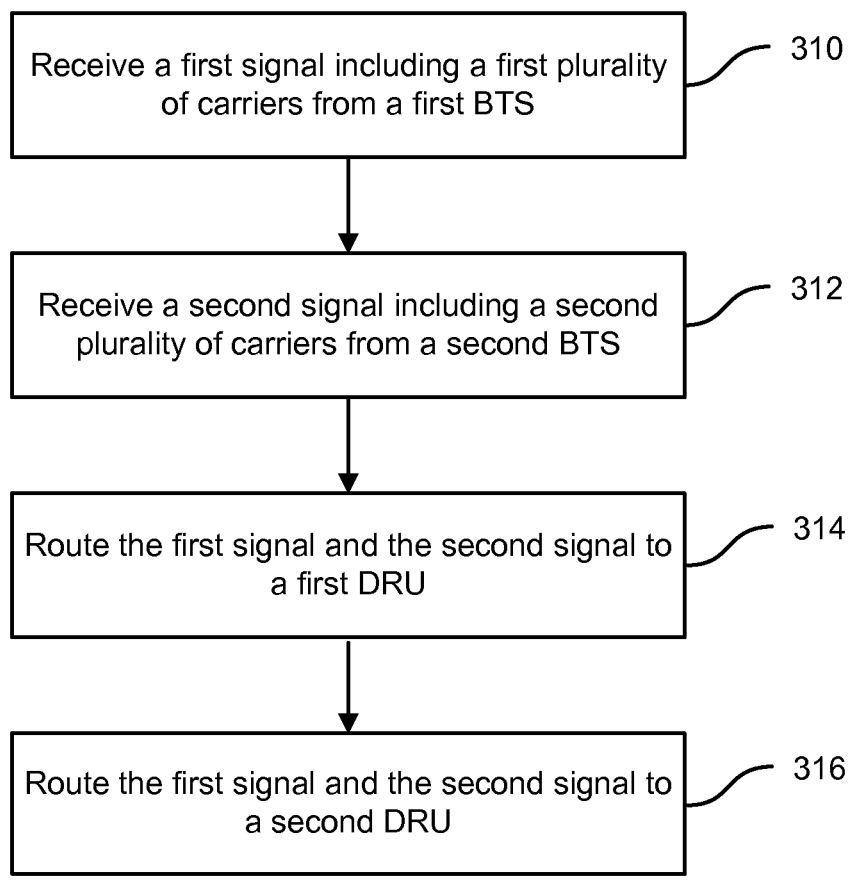
FIG. 3 is a simplified flowchart illustrating a method of operating a virtual DAS network according to an embodiment of the present invention.

FIG. 3 is a simplified flowchart illustrating a method of operating a virtual DAS network according to an embodiment of the present invention. At 310, a first signal including a first plurality of carriers from a first BTS may be received. At 312, a second signal including a second plurality of carriers from a second BTS may be received. At 314, the first and second signal may be routed to a first DRU. At 316, the first and second signal may be routed to a second DRU.

Figure 4:
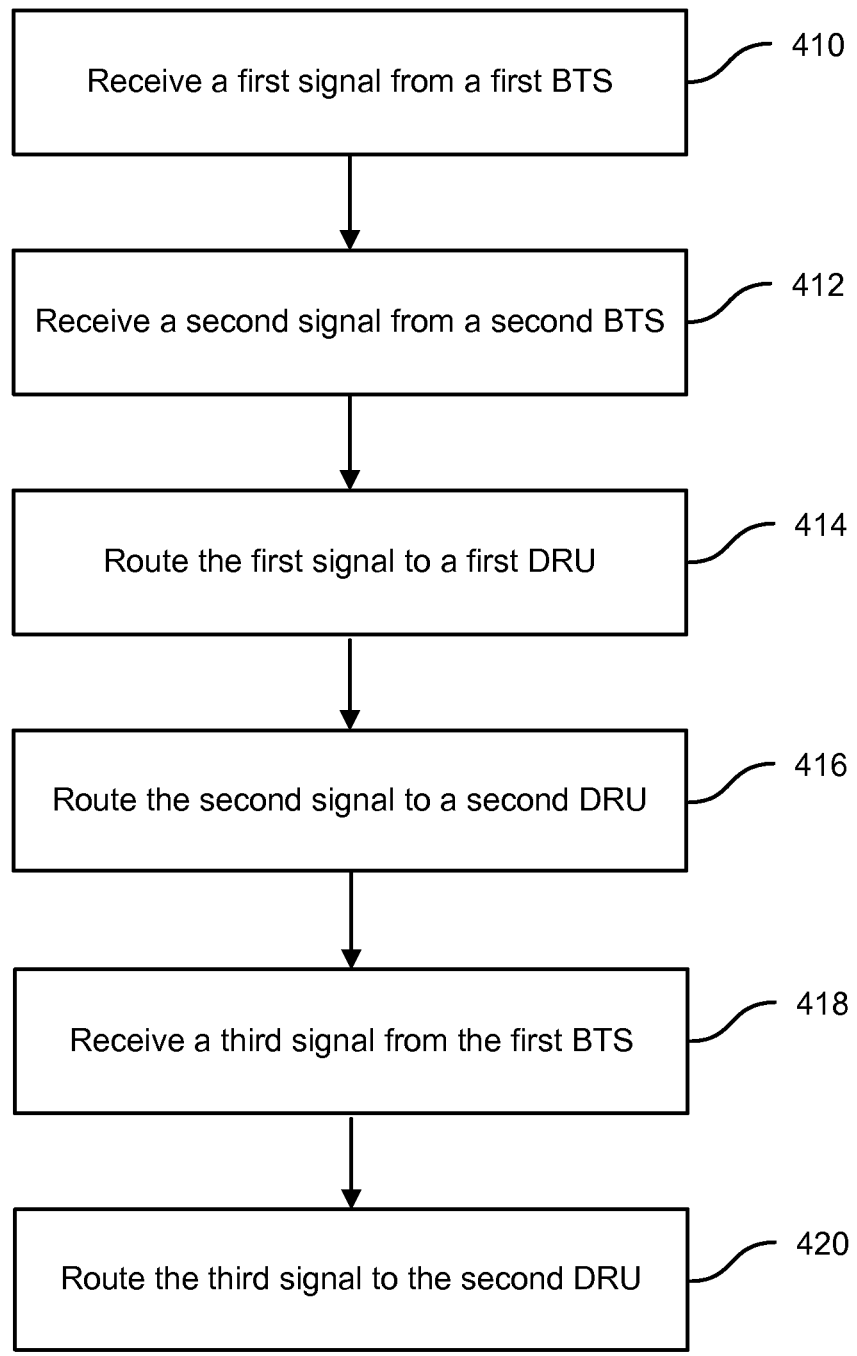
FIG. 4 is a simplified flowchart illustrating a method of operating a virtual DAS network according to an embodiment of the present invention.

FIG. 4 is a simplified flowchart illustrating a method of operating a virtual DAS network according to an embodiment of the present invention. At 410, a first signal from a first BTS may be received. At 412, a second signal from a second BTS may be received. At 414, the first signal may be routed to a first DRU. At 416, the second signal may be routed to a second DRU. Signals subsequently received from the BTSs may be routed differently (e.g., based on network demands). For example, at 418, a third signal may be received from the first BTS. At 420, the third signal may be routed to the second DRU, rather than the first DRU. It may be apparent that the descriptions of FIGS. 3 and 4 may correspond to any of the descriptions provided in FIGS. 1B and 2.

It should be appreciated that the specific steps illustrated in FIG. 3 or FIG. 4 provide a particular method of operating a virtual DAS network according to some embodiments of the present invention. Other sequences of steps may also be performed according to alternative embodiments. For example, alternative embodiments of the present invention may perform the steps outlined above in a different order. Moreover, the individual steps illustrated in FIG. 3 or FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
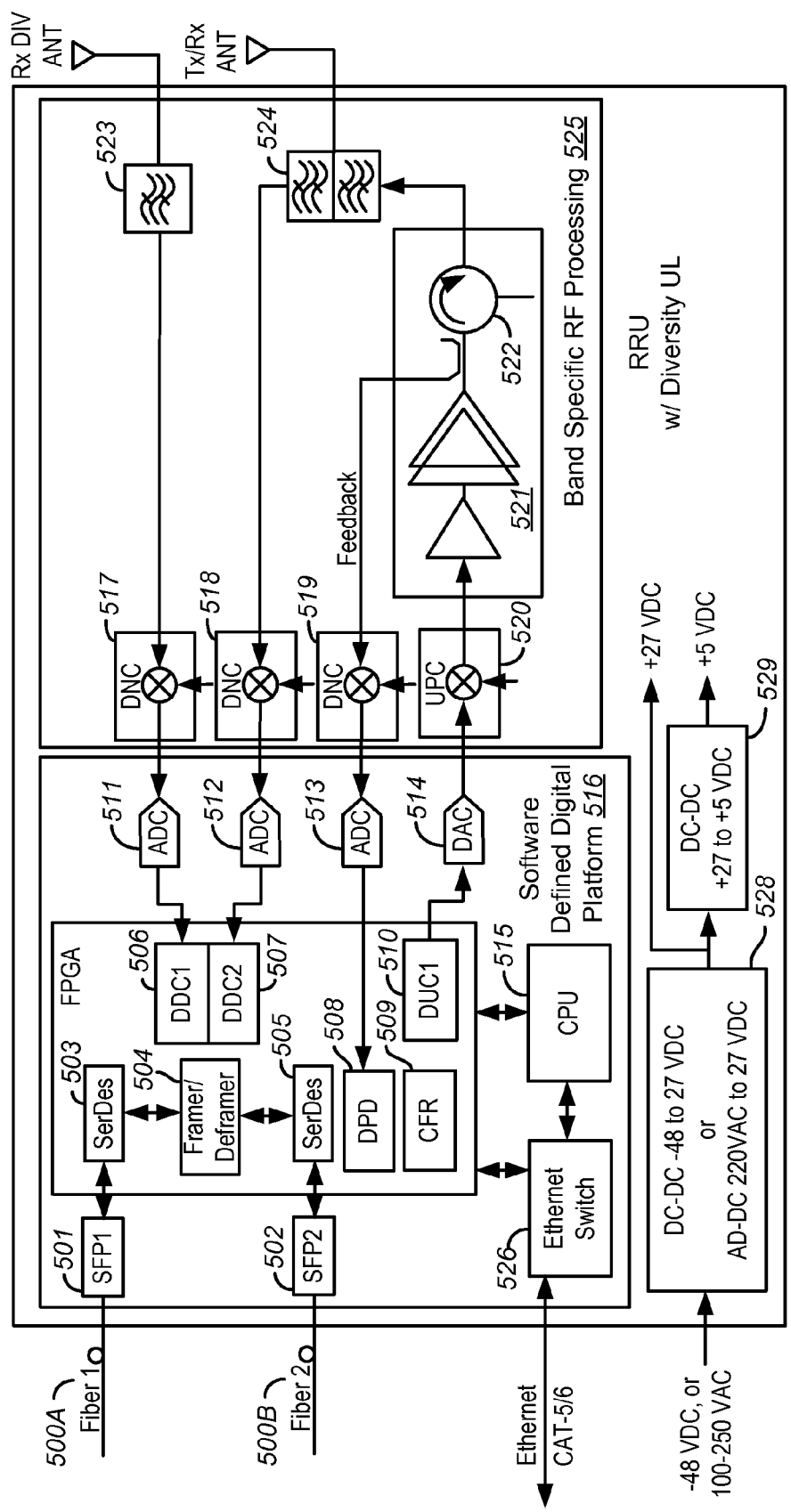
FIG. 5 is a block diagram showing a multi-channel High Power Remote Radio Head Unit according to one embodiment of the present invention.

An embodiment of a Remote Radio Head Unit in accordance with the invention is shown in FIG. 5. Additional description related to remote radio head units is provided in U.S. patent application Ser. No. 13/211,236, filed on Aug. 16, 2011, the disclosure of which is hereby incorporated by reference in its entirety for all purposes. Fiber 1, indicated at 500A, may be a high speed fiber cable that transports data between the BTS and the Remote Radio Head Unit. Fiber 2, indicated at 500B, may be used to daisy chain other remote radio head units which are thereby interconnected to the BTS or DAU. The software-defined digital platform 516 may perform baseband signal processing, typically in an FPGA or equivalent. Building block 503 is a Serializer/Deserializer. The deserializer portion may extract the serial input bit stream from the optical fiber 501 and converts it into a parallel bit stream. The serializer portion performs the inverse operation for sending data from the Remote Radio Head Unit to the BTS. In an embodiment, the two distinct bit streams communicate with the BTS using different optical wavelengths over one fiber, although multiple fibers can be used in alternative arrangements. The deframer 504 deciphers the structure of the incoming bit stream and sends the deframed data to the Crest Factor Reduction Algorithm 509. The Crest Factor Reduction block 509 may reduce the Peak-to-Average Ratio of the incoming signal so as to improve the Power amplifier DC-to-RF conversion efficiency. The waveform may then be presented to the Digital Predistorter block 508. The digital predistorter may compensate for the nonlinearities of the Power Amplifier 521 in an adaptive feedback loop. Digital Upconverter 510 may filter and digitally translate the deframed signal to an IF frequency. The Framer 504 may take the data from the two digital downconverters 506, 507 and may pack it into a Frame for transmission to the BTS over the optical fiber 501. Elements 511 and 512 are Analog to Digital converters that may be used to translate the two analog receive signals into digital signals. The receiver comprises a diversity branch which contains a downconverter 517 and a Band Pass Filter 523. The main branch has a receiver path comprised of a duplexer 524 and a downconverter 518. In some embodiments, one or both downconverters 517 and 518 can have an integral uplink low-noise amplifier.

The power amplifier has an output coupler for extracting a replica of the output signal in the feedback path. The feedback signal is frequency-translated by downconverter 519 to either an IF frequency or baseband and presented to an Analog to Digital converter 513. This feedback signal is used in an adaptive loop for performing Digital Predistortion to compensate for any nonlinearities created by the power amplifier.

The Ethernet cable is used to locally communicate with the Remote Radio Head Unit. Switch 526 is used to allow easy access to either the FPGA or the CPU. DC power converters 528 and 529 are used to obtain the desired DC voltages for the Remote Radio Head Unit. Either an external voltage can be connected directly into the RRU or the DC power may be supplied through the Ethernet cable.

Although the description of the instant embodiment is directed to an application where a second optical fiber connection provides a capability for daisy chaining to other Remote Radio Head Units, an alternative embodiment provides multiple optical fiber connections to support a modified "hybrid star" configuration for appropriate applications which dictate this particular optical transport network configuration.

Figure 6:
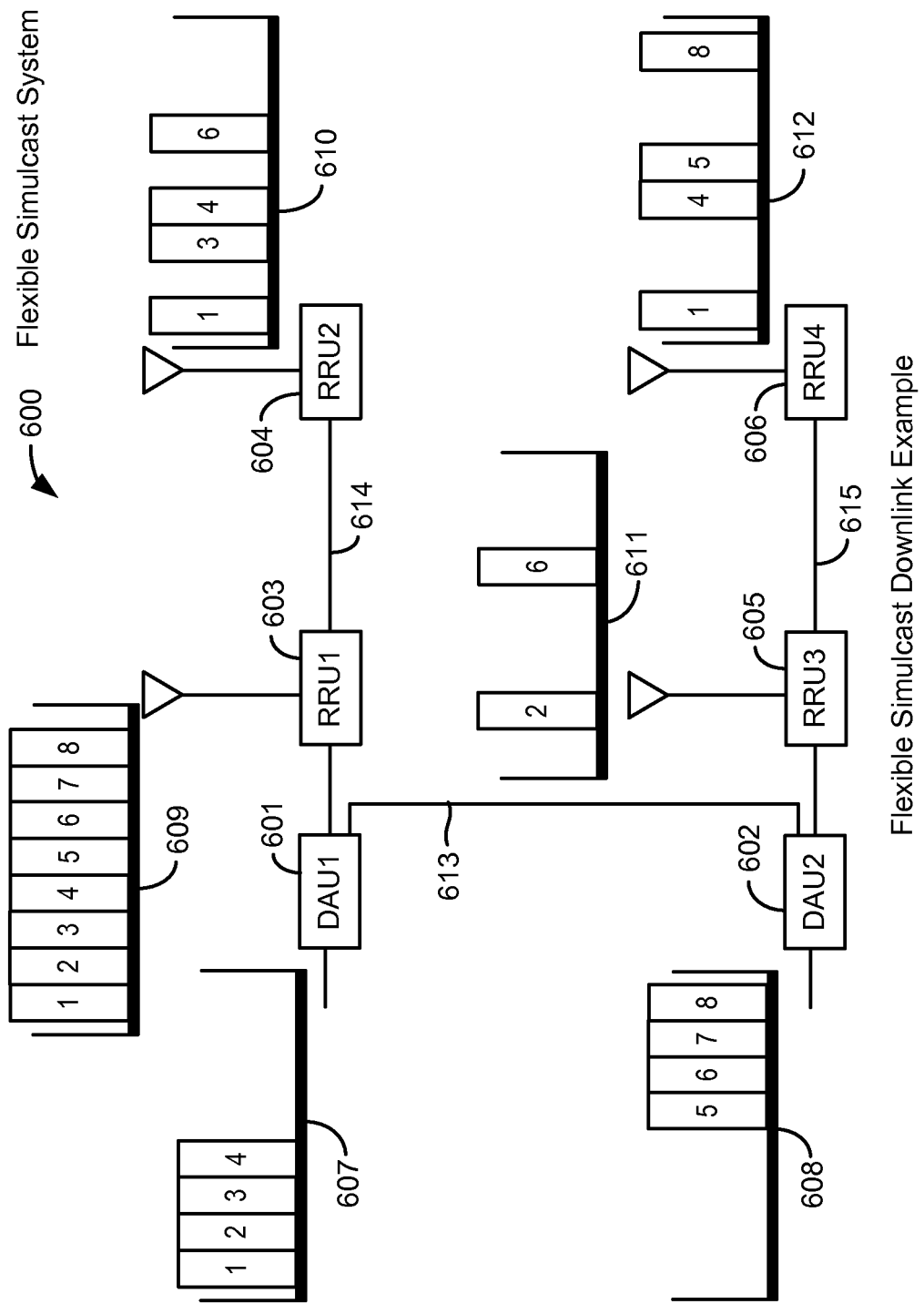
FIG. 6 is a block diagram according to one embodiment of the invention showing the basic structure and an example of a Flexible Simulcast downlink transport scenario based on having 2 DAU and 4 DRU.

Referring to FIG. 6 of the instant patent application, an alternative embodiment of the present invention may be described as follows. In a previous arrangements, an embodiment involved having downlink signals from two separate base stations belonging to the same wireless operator enter DAU1 and DAU2 input ports respectively. In an alternative embodiment, a second composite downlink input signal from e.g., a second base station belonging to a different wireless operator enters DAU2 at the DAU2 RF input port. In this embodiment, signals belonging to both the first operator and the second operator are converted and transported to RRU1 603, RRU2 604, RRU3 605 and RRU4 606, respectively. This embodiment provides an example of a neutral host wireless system, where multiple wireless operators share a common infrastructure comprised of DAU1 601, DAU2 602, RRU1 603, RRU2 604, RRU3 605 and RRU4 606. Signals belonging to both the first operator and the second may reach all RRUs described herein because DAU1 601 and DAU2 602 may be connected via cable 613. Thus, bandwidths 607 provided to DAU1 601 and bandwidths 608 provided to DAU2 602 may reach any and all of the RRUs described herein. For example, all carrier bandwidths 607 and 608 may be provided to RRU1 603, as shown in bandwidth output 609. In contrast, only bandwidth inputs 1, 3, 4, 6 may need to be provided to RRU2 604, as shown in bandwidth output 610. Additionally, only bandwidth inputs 2 6 may need to be provided to RRU 3 605, as shown in bandwidth output 611. Last, RRU4 606 may only need to provide bandwidth inputs 1, 4, 5, and 8 as shown in bandwidth output 612. Thus, for example, two different carriers, one each controlling DAU1 and DAU2, respectively, may be able to provide coverage to all of the RRUs according to embodiments presented herein. All the previously mentioned features and advantages accrue to each of the two wireless operators. Additional description related to this embodiment is provided in U.S. patent application Ser. No. 13/211,243, filed on Aug. 16, 2011, the disclosure of which is hereby incorporated by reference in its entirety for all purposes.

As disclosed in U.S. Provisional Application Ser. No. 61/374,593, titled "Neutral Host Architecture for a Distributed Antenna System," filed Aug. 17, 2010 and also referring to FIG. 6 of the instant patent application, the Digital Up Converters present in the RRU can be programmed to process various signal formats and modulation types including FDMA, CDMA, TDMA, OFDMA and others. Also, the Digital Up Converters present in the respective RRUs can be programmed to operate with signals to be transmitted within various frequency bands subject to the capabilities and limitations of the system architecture disclosed in U.S. Provisional Application Ser. No. 61/374,593, titled "Neutral Host Architecture for a Distributed Antenna System," filed Aug. 17, 2010. In one embodiment of the present invention where a wideband CDMA signal is present within e.g., the bandwidth corresponding to carrier 1 at the input port to DAU1, the transmitted signal at the antenna ports of RRU1, RRU2 and RRU4 will be a wideband CDMA signal which is virtually identical to the signal present within the bandwidth corresponding to carrier 1 at the input port to DAU1.

As disclosed in U.S. Provisional Application Ser. No. 61/374,593, titled "Neutral Host Architecture for a Distributed Antenna System," filed Aug. 17, 2010 and also referring to FIG. 6 of the instant patent application, it is understood that the Digital Up Converters present in the respective RRUs can be programmed to transmit any desired composite signal format to each of the respective RRU antenna ports. As an example, the Digital Up Converters present in RRU1 and RRU2 can be dynamically software-reconfigured as described previously so that the signal present at the antenna port of RRU1 would correspond to the spectral profile shown in FIG. 6 as 610, and also that the signal present at the antenna port of RRU2 would correspond to the spectral profile shown in FIG. 6 as 609. One application for such a dynamic re-arrangement of RRU capacity would be e.g., if a company meeting were suddenly convened in the area of the enterprise corresponding to the coverage area of RRU2. Although the description of some embodiments in the instant application refers to base station signals 607 and 608 as being on different frequencies, the system and method of the present invention readily supports configurations where one or more of the carriers which are part of base station signals 607 and 608 and are identical frequencies, since the base station signals are digitized, packetized, routed and switched to the desired RRU.

Figure 7:
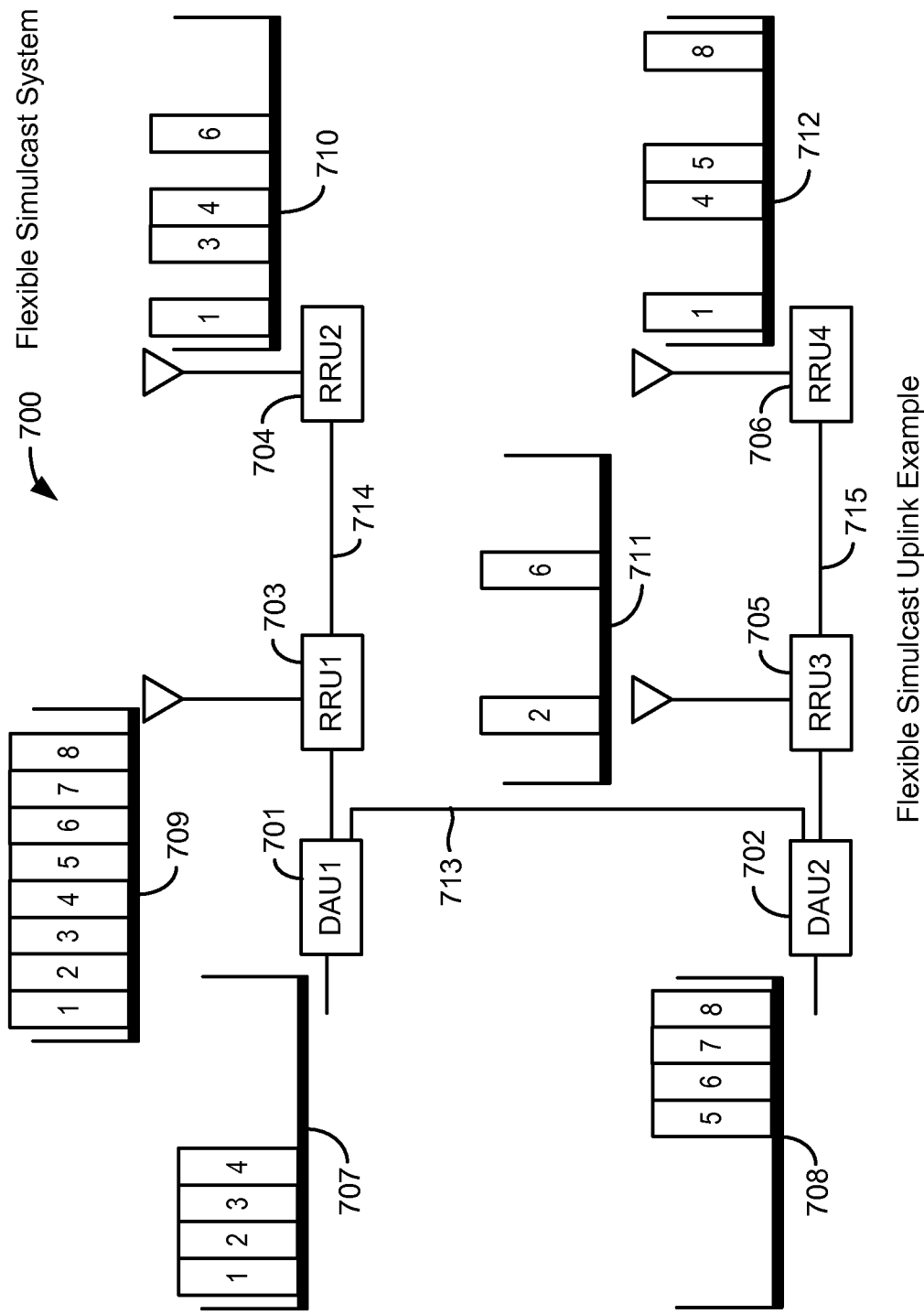
FIG. 7 is a block diagram in accordance with an embodiment of the invention showing the basic structure and an example of a Flexible Simulcast uplink transport scenario based on having 2 DAU and 4 DRU.

Another embodiment of the Distributed Antenna System in accordance with the present invention is shown in FIG. 7. As disclosed in U.S. Provisional Application Ser. No. 61/374,593, titled "Neutral Host Architecture for a Distributed Antenna System," filed Aug. 17, 2010 and also as shown in FIG. 7 the Flexible Simulcast System 700 can be used to explain the operation of Flexible Simulcast with regard to uplink signals. As discussed previously with regard to downlink signals and by referring to FIG. 6, the uplink system shown in FIG. 7 is mainly comprised of DAU1 indicated at 701, RRU1 indicated at 703, RRU2 indicated at 704, DAU2 indicated at 702, RRU3 indicated at 705, and RRU4 indicated at 706. In a manner similar to the downlink operation explained by referring to FIG. 6, the operation of the uplink system shown in FIG. 7 can be understood as follows.

The Digital Down Converters present in each of RRU1 703, RRU2 704, RRU3 705 and RRU4 706 are dynamically software-configured as described previously so that uplink signals of the appropriate desired signal format(s) present at the receive antenna ports of the respective RRU1 703, RRU2 704, RRU3 705 and RRU4 706 are selected based on the desired uplink band(s) to be processed and filtered, converted and transported to the appropriate uplink output port of either DAU1 701 or DAU2 702. The DAUs and RRUs frame the individual data packets corresponding to their respective radio signature using the Common Public Interface Standard (CPRI). Other Interface standards are applicable provided they uniquely identify data packets with respective RRUs. Header information is transmitted along with the data packet which identifies the RRU and DAU that corresponds to the individual data packet.

In one example for the embodiment shown in FIG. 7, RRU1 703 and RRU3 705 are configured to receive uplink signals within the Carrier 2 bandwidth, whereas RRU2 704 and RRU4 706 are both configured to reject uplink signals within the Carrier 2 bandwidth. When RRU3 705 receives a strong enough signal at its receive antenna port within the Carrier 2 bandwidth to be properly filtered and processed, the Digital Down Converters within RRU3 facilitate processing and conversion. Similarly, when RRU1 receives a strong enough signal at its receive antenna port within the Carrier 2 bandwidth to be properly filtered and processed, the Digital Down Converters within RRU1 703 facilitate processing and conversion. The signals from RRU1 703 and RRU3 705 are combined based on the active signal combining algorithm, and are fed to the base station connected to the uplink output port of DAU1 701. The term simulcast is frequently used to describe the operation of RRU1 703 and RRU3 705 with regard to uplink and downlink signals within Carrier 2 bandwidth. The term Flexible Simulcast refers to the fact that the present invention supports dynamic and/or manual rearrangement of which specific RRU are involved in the signal combining process for each Carrier bandwidth.

Referring to FIG. 7, the Digital Down Converters present in RRU1 are configured to receive and process signals within Carrier 1-8 bandwidths. The Digital Down Converters present in RRU2 are configured to receive and process signals within Carrier 1, 3, 4 and 6 bandwidths. The Digital Down Converters present in RRU3 are configured to receive and process signals within Carrier 2 and 6 bandwidths. The Digital Down Converters present in RRU4 are configured to receive and process signals within Carrier 1, 4, 5 and 8 bandwidths. The respective high-speed digital signals resulting from processing performed within each of the four RRU are routed to the two DAUs. As described previously, the uplink signals from the four RRUs are combined within the respective DAU corresponding to each base station.

An aspect of the present invention includes an integrated Pilot Beacon function within the each RRU. In an embodiment, each RRU comprises a unique software programmable Pilot Beacon as discussed hereinafter This approach is intended for use in CDMA and/or WCDMA indoor DAS networks. A very similar approach can be effective for indoor location accuracy enhancement for other types of networks such as LTE and WiMAX. Because each RRU is already controlled and monitored via the DAUs which comprise the network, there is no need for costly deployment of additional dedicated wireless modems for remote monitoring and control of pilot beacons.

An RRU-integrated Pilot Beacon approach is employed for both CDMA and WCDMA networks. Each operational pilot beacon function within an RRU employs a unique PN code (in that area) which effectively divides the WCDMA or CDMA indoor network coverage area into multiple small "zones" (which each correspond to the coverage area of a low-power Pilot Beacon). Each Pilot Beacon's location, PN code and RF Power level are known by the network. Each Pilot Beacon is synchronized to the WCDMA or CDMA network, via its connection to the DAU.

Unlike the transmit signal from a base station which is "dynamic," the Pilot Beacon transmit signal will be effectively "static" and its downlink messages will not change over time based on network conditions.

For a WCDMA network, in Idle mode each mobile subscriber terminal is able to perform Pilot Signal measurements of downlink signals transmitted by base stations and Pilot Beacons. When the WCDMA mobile subscriber terminal transitions to Active mode, it reports to the serving cell all its Pilot Signal measurements for base stations and for Pilot Beacons. For CDMA networks, the operation is very similar. For some RRU deployed in an indoor network, the RRU can be provisioned as either a Pilot Beacon or to serve mobile subscribers in a particular operator bandwidth, but not both.

For a WCDMA network, existing inherent capabilities of the globally-standardized networks are employed. The WCDMA mobile subscriber terminal is able to measure the strongest CPICH RSCP (Pilot Signal Code Power) in either Idle mode or any of several active modes. Also, measurements of CPICH Ec/No by the mobile subscriber terminal in either Idle mode or any of several active modes are possible. As a result, the mobile subscriber terminal reports all available RSCP and Ec/No measurements via the serving base station (whether indoor or outdoor) to the network. Based on that information, the most likely mobile subscriber terminal location is calculated and/or determined. For CDMA networks, the operation is very similar to the process described herein.

A previously described embodiment of the present invention referring to FIG. 6 involved having a wideband CDMA signal present within e.g., the bandwidth corresponding to carrier 1 at the input port to DAU1. In the previously described embodiment, the transmitted signal at the antenna ports of RRU1, RRU2 and RRU4 is a wideband CDMA signal which is virtually identical to the signal present within the bandwidth corresponding to carrier 1 at the input port to DAU1. An alternative embodiment of the present invention is one where a wideband CDMA signal is present within e.g., the bandwidth corresponding to carrier 1 at the input port to DAU1. However, in the alternative embodiment the transmitted signal at the antenna port of RRU1 differs slightly from the previous embodiment. In the alternative embodiment, a wideband CDMA signal is present within e.g., the bandwidth corresponding to carrier 1 at the input port to DAU1. The transmitted signal from RRU1 is a combination of the wideband CDMA signal which was present at the input port to DAU1, along with a specialized WCDMA pilot beacon signal. The WCDMA pilot beacon signal is intentionally set well below the level of the base station pilot signal.

Figure 8:
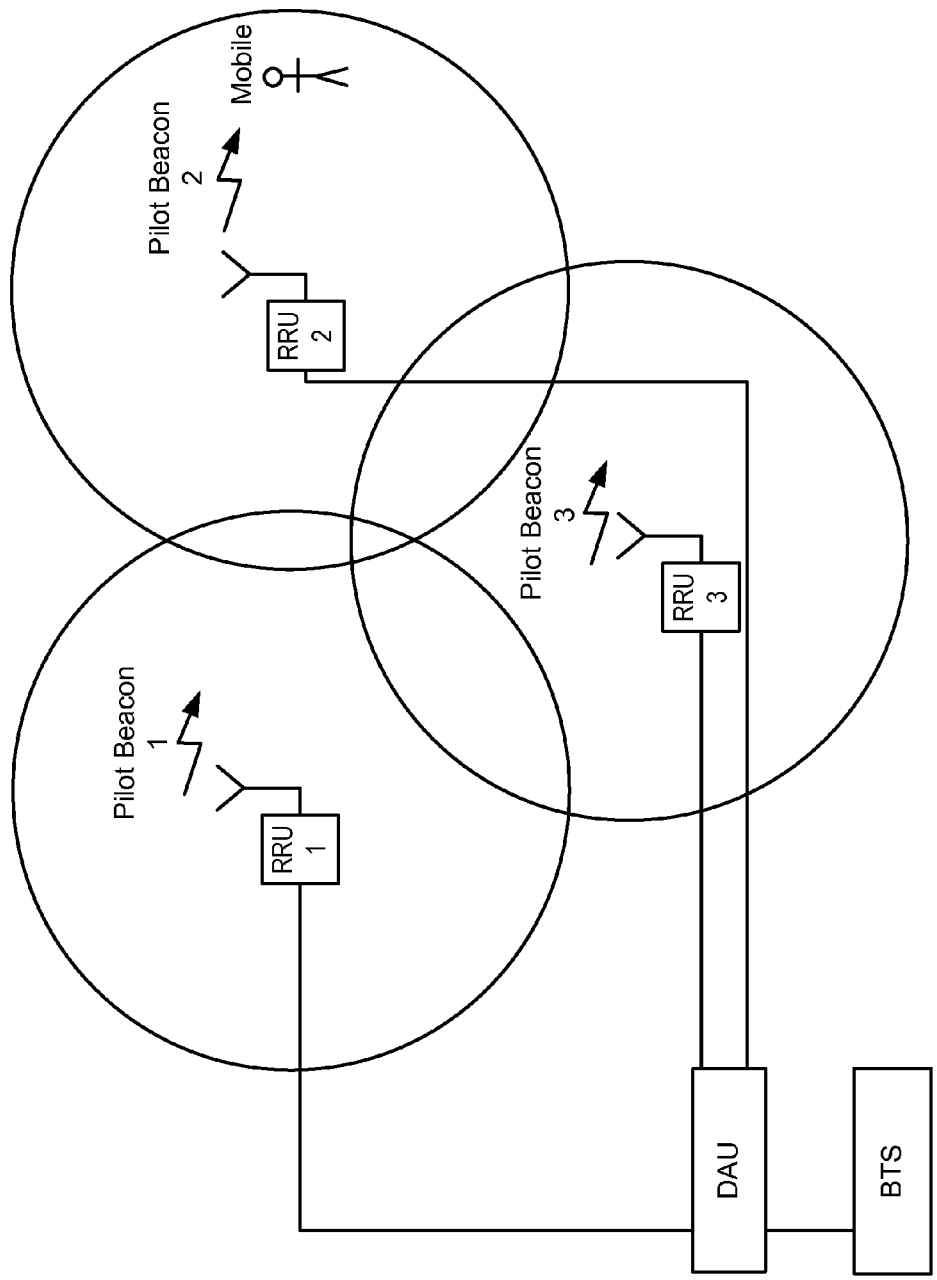
FIG. 8 shows an embodiment of an indoor system employing multiple Remote Radio Head Units (RRUs) and a central Digital Access Unit (DAU)

A further alternative embodiment can be explained referring to FIG. 8 which applies in the case where CDMA signals are generated by the base station connected to the input port of DAU1. In this further alternative embodiment of the present invention, the transmitted signal at the antenna port of RRU1 is a combination of the CDMA signal which was present at the input port to DAU1, along with a specialized CDMA pilot beacon signal. The CDMA pilot beacon signal is intentionally set well below the level of the base station pilot signal.

Figure 9:
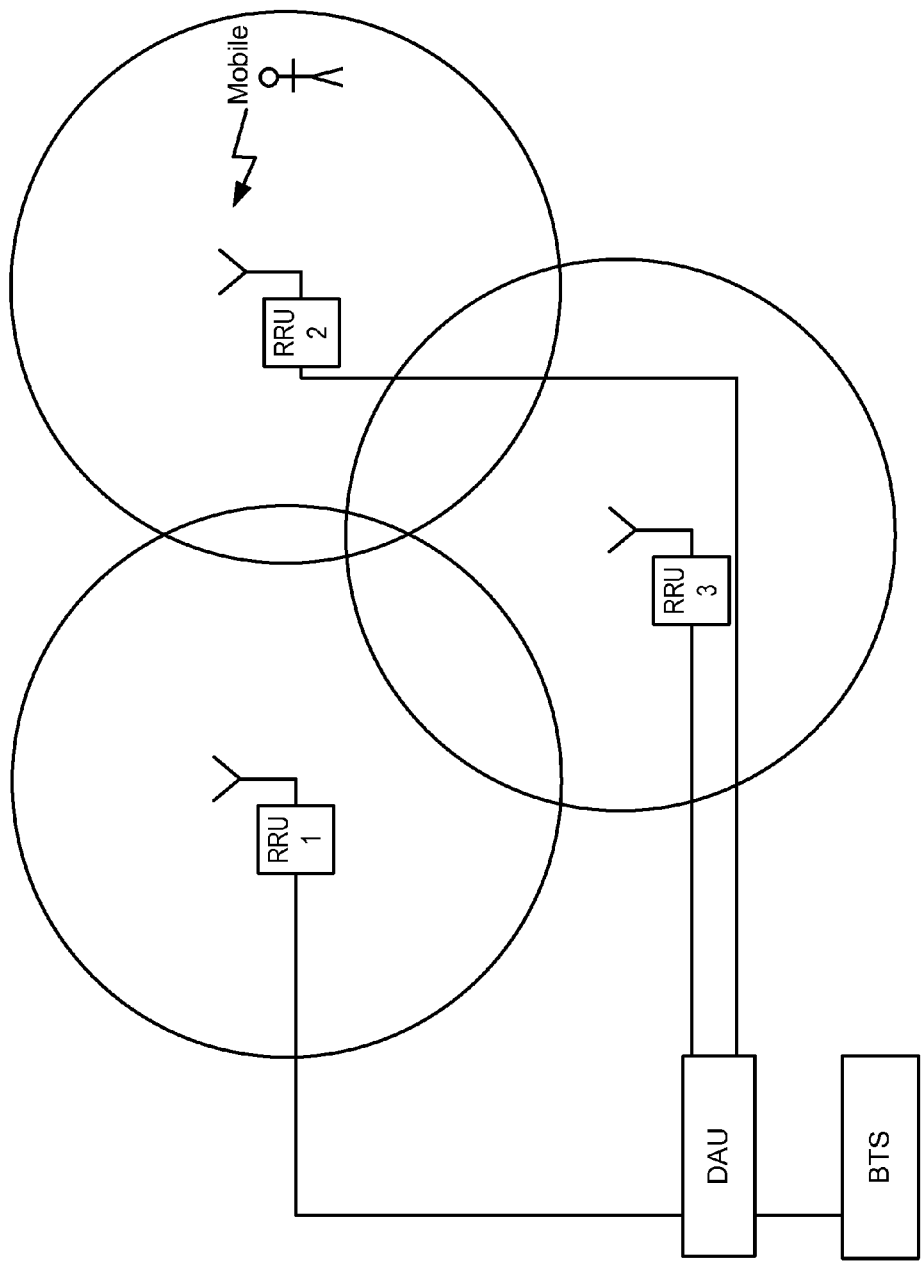
FIG. 9 shows an embodiment of an indoor system in accordance with the invention which employs multiple Remote Radio Head Units (RRUs) and a central Digital Access Unit (DAU)

An embodiment of the present invention provides enhanced accuracy for determining location of indoor wireless subscribers. FIG. 9 depicts a typical indoor system employing multiple Remote Radio Head Units (RRUs) and a central Digital Access Unit (DAU). Each Remote Radio Head provides a unique header information on data received by that Remote Radio Head. This header information in conjunction with the mobile user's radio signature are used to localize the user to a particular cell. The DAU signal processing can identify the individual carriers and their corresponding time slots. A header is included with each data packet that uniquely identifies the corresponding RRU. The DAU can detect the carrier frequency and the corresponding time slot associated with the individual RRUs. The DAU has a running data base that identifies each carrier frequency and time slot with a respective RRU. The carrier frequency and time slot is the radio signature that uniquely identifies the GSM user.

Figure 10:
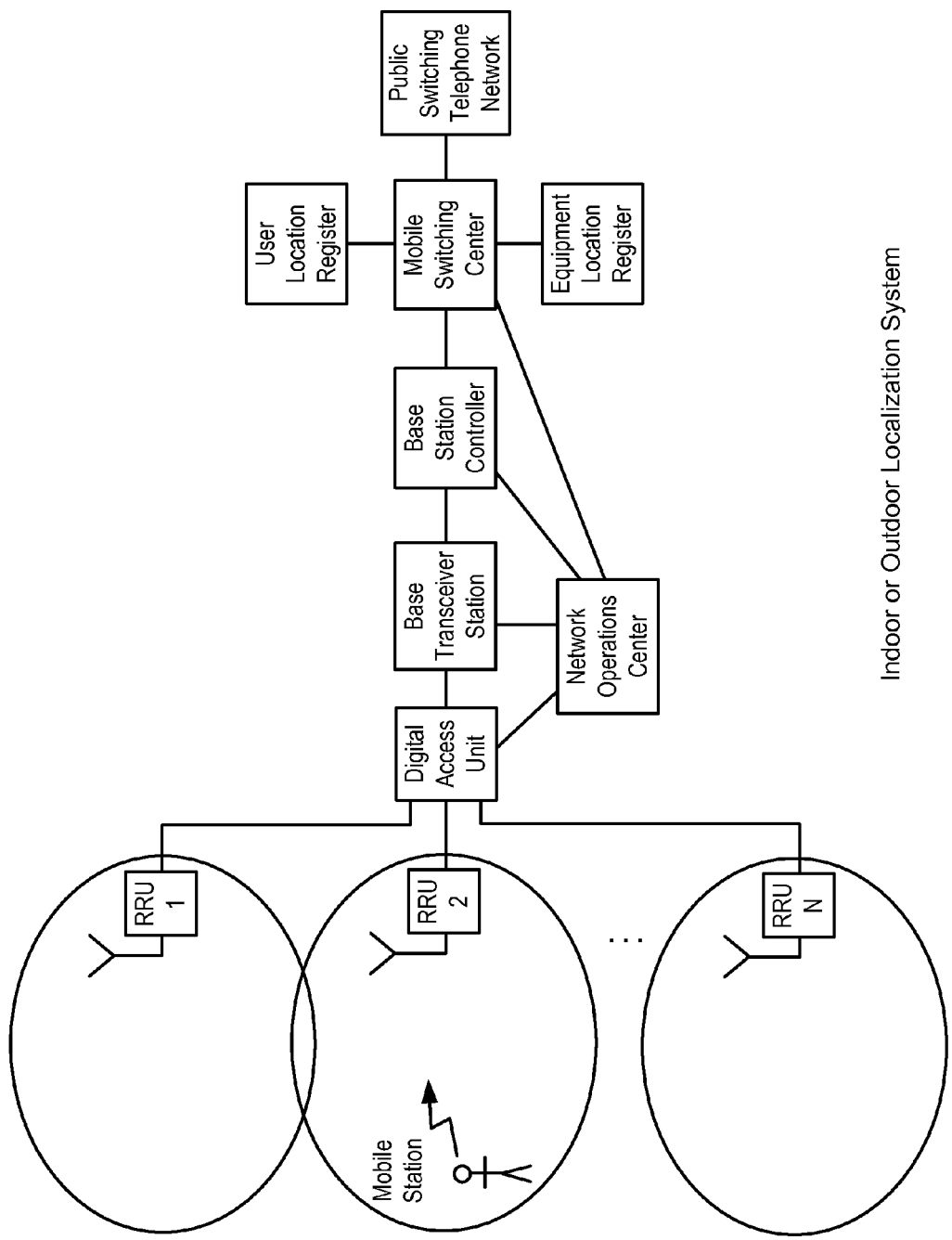
FIG. 10 illustrates an embodiment of a cellular network system employing multiple Remote Radio Heads according to the present invention.

The DAU communicates with a Network Operation Center (NOC) via a Ethernet connection or an external modem, as depicted in FIG. 10. Once a E911 call is initiated the Mobile Switching Center (MSC) in conjunction with the NOC can identify the corresponding BaseTransceiver Station (BTS) where the user has placed the call. The user can be localized within a BTS cell. The NOC then makes a request to the individual DAUs to determine if the E911 radio signature is active in their indoor cell. The DAU checks its data base for the active carrier frequency and time slot. If that radio signature is active in the DAU, then that DAU will provide the NOC with the location information of the corresponding RRU.

A further embodiment of the present invention includes LTE to provide enhanced accuracy for determining the location of indoor wireless subscribers. GSM uses individual carriers and time slots to distinguish users whereas LTE uses multiple carriers and time slot information to distinguish users. The DAU can simultaneously detect multiple carriers and their corresponding time slots to uniquely identify the LTE user. The DAU has a running data base that identifies the carrier frequencies and time slot radio signature for the respective RRU. This information can be retrieved from the NOC once a request is made to the DAU.

Figure 11:
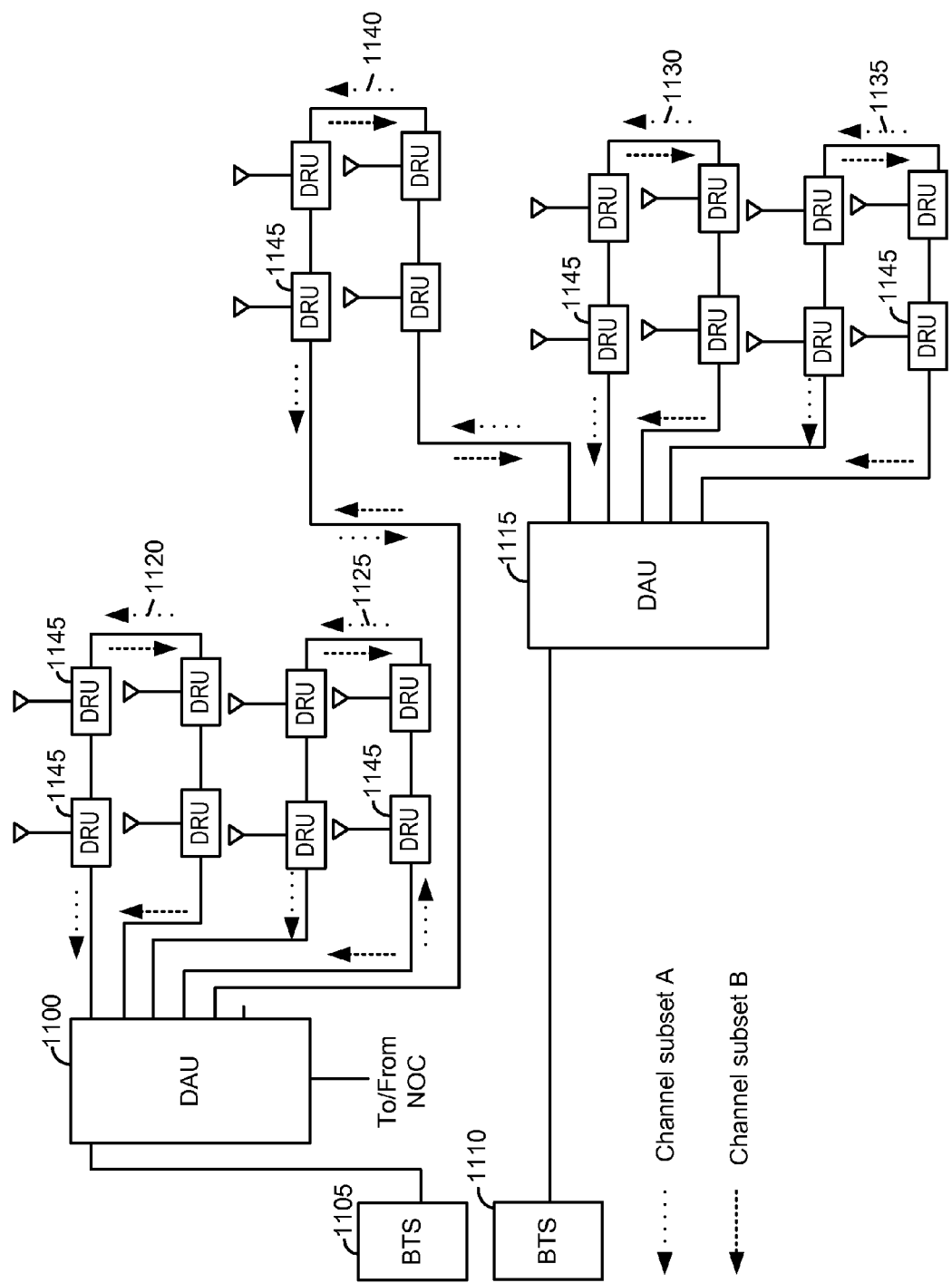
FIG. 11 is a block diagram in accordance with an embodiment of the invention showing the basic structure and an example of a unidirectional channelized uplink or downlink transport. This example of a five ring scenario comprises two DAUs and twenty DRUs.
Figure 15:
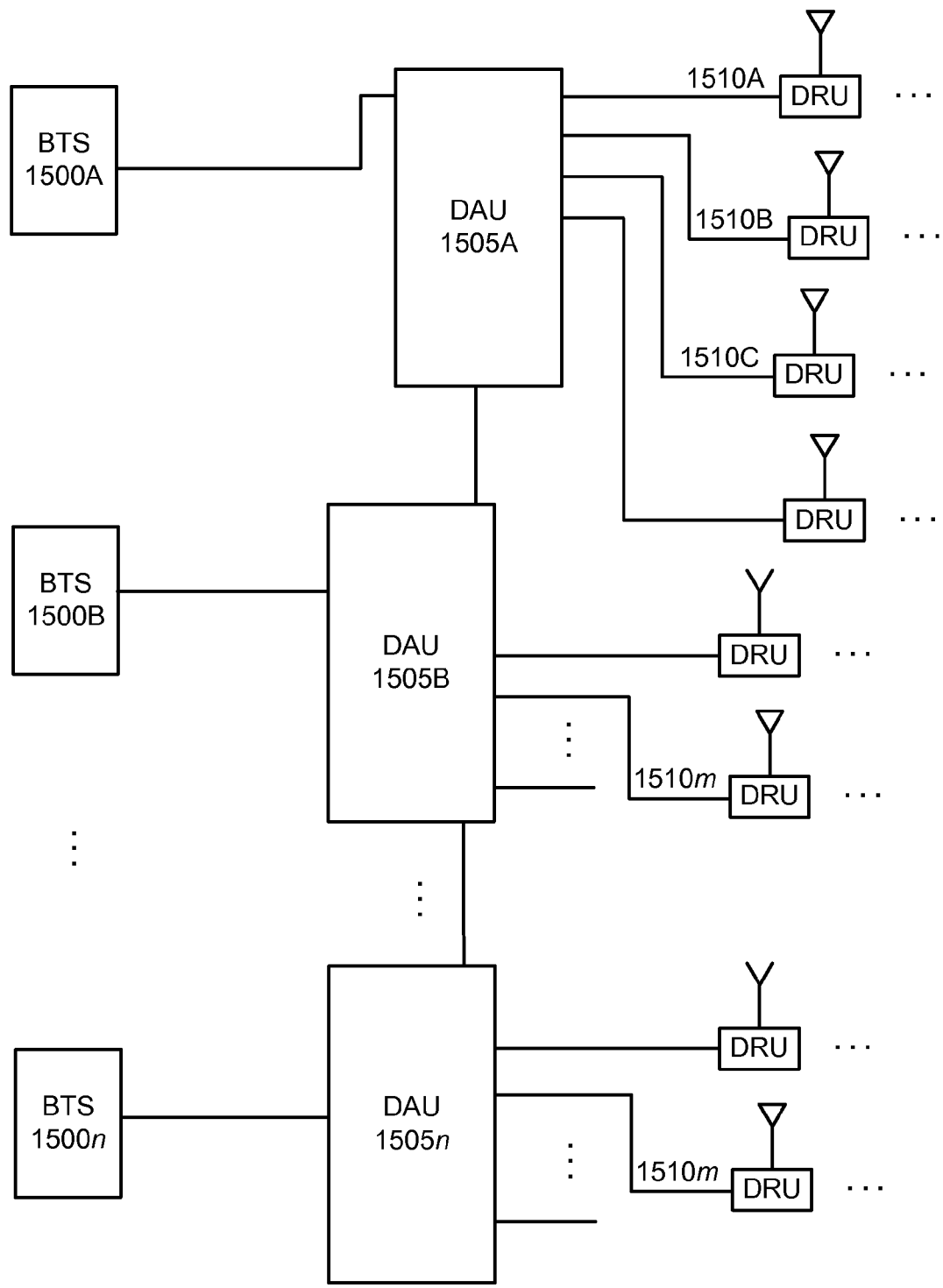
FIG. 15 illustrates in block diagram form an embodiment of a DAS according to an aspect of the invention, including daisy-chained DAU's.

Referring next to FIG. 11, a still further an alternative embodiment of the present invention may be understood. Additional description related to this alternative embodiment is provided in U.S. patent application Ser. No. 13/211, 247, filed on Aug. 16, 2011, the disclosure of which is hereby incorporated by reference in its entirety for all purposes. In the embodiment of FIG. 11, a first composite signal enters a first DAU 1100 at that DAU's RF input port from a base station 1105, and a second composite downlink input signal from, e.g., a second base station 1110 belonging to a different wireless operator enters DAU 1115 at that second DAU's RF input port. DAU 1100 directly supports two rings 1120 and 1125, DAU 1115 directly supports two rings 1130 and 1135, and a ring 1140 is shared between DAU 1100 and DAU 1105. Each of the rings comprises daisy-chained DRU's generally indicated at 1145 and connected via, for example, fiber optic links. It will be noted that channels A are transported in the opposite sense as channels B. The downlink channels in subset A are transported counterclockwise around each ring, whereas the channels in subset B are transported in a clockwise sense around each ring. In this embodiment, signals belonging to both the first operator and the second operator are converted and transported to the DRU's 1145 on ring 1140 because DAU 1100 and DAU 1105 are daisy-chained through the fiber optic cable 1140. This embodiment provides an example of a neutral host wireless system, where multiple wireless operators share a common infrastructure comprised of DAU 1100, DAU 1115, and DRU's 1145. All the previously mentioned features and advantages accrue to each of the two wireless operators. It will further be appreciated that, while FIG. 11 illustrates only two DAU's linked in daisy-chain style, it is possible to daisy chain a larger plurality of DAU's, and the daisy-chained DAU's can also be configured in a ring configuration similar to the manner in which the DRU's are connected. This arranged is illustrated in FIG. 15, below.

Figure 12:
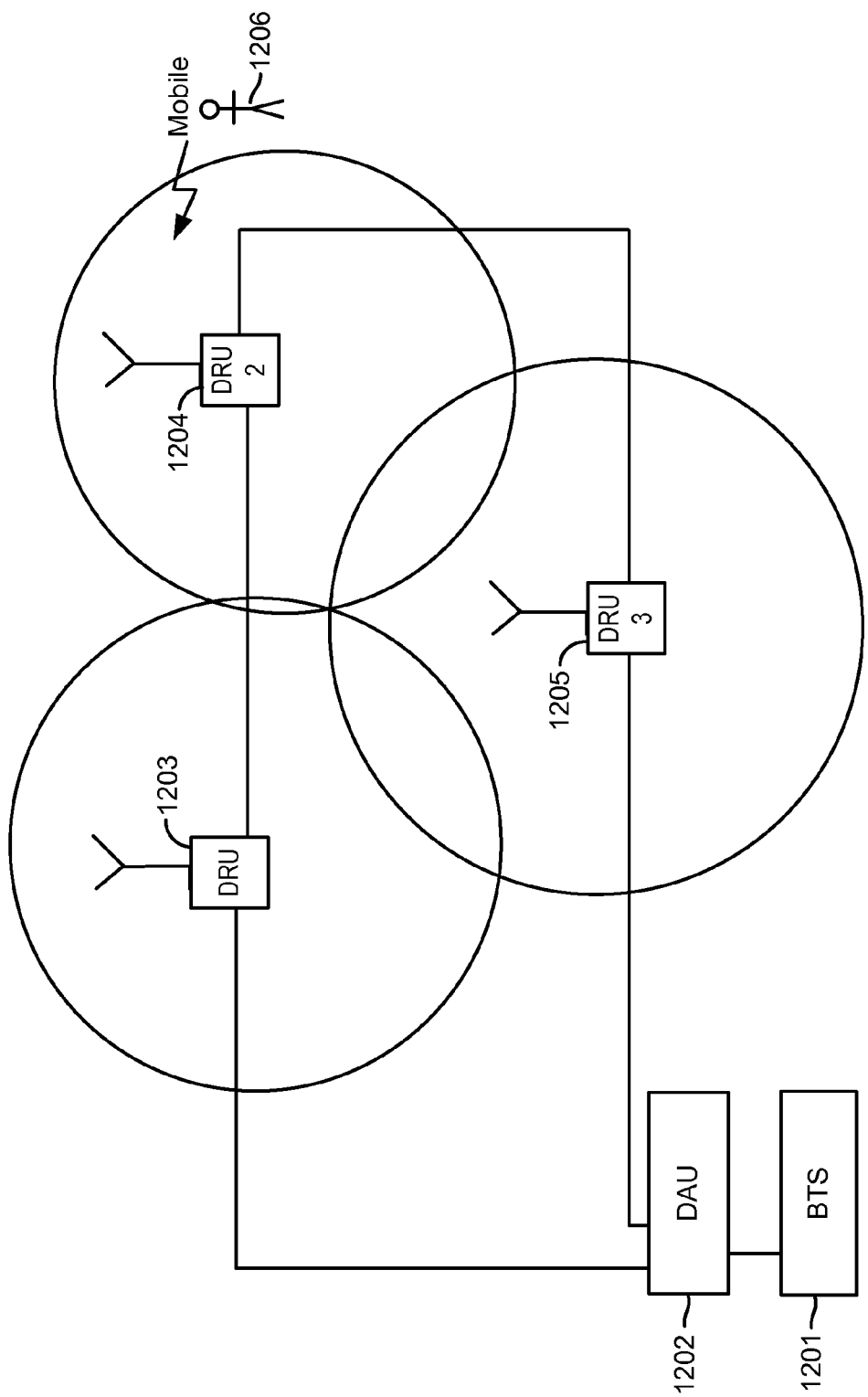
FIG. 12 illustrates an embodiment of a cellular network system employing multiple DRUs according to the present invention.

Referring next to FIG. 12, an alternative embodiment of the present invention may be better understood. Each DRU has a coverage radius that can be adjusted based on the power transmission from that particular remote unit. The DAU controls the various DRU's transmission power and can optimize the overall coverage zone. In the illustrated embodiment, DAU 1202, again under the control of a NOC (not shown), is associated with a base station 1201 and in turn interfaces with three DRU's 1203, 1204 and 1205. A user 1206 with a mobile device is provided relatively uniform coverage throughout the area covered by the three DRU's.

Figure 13:
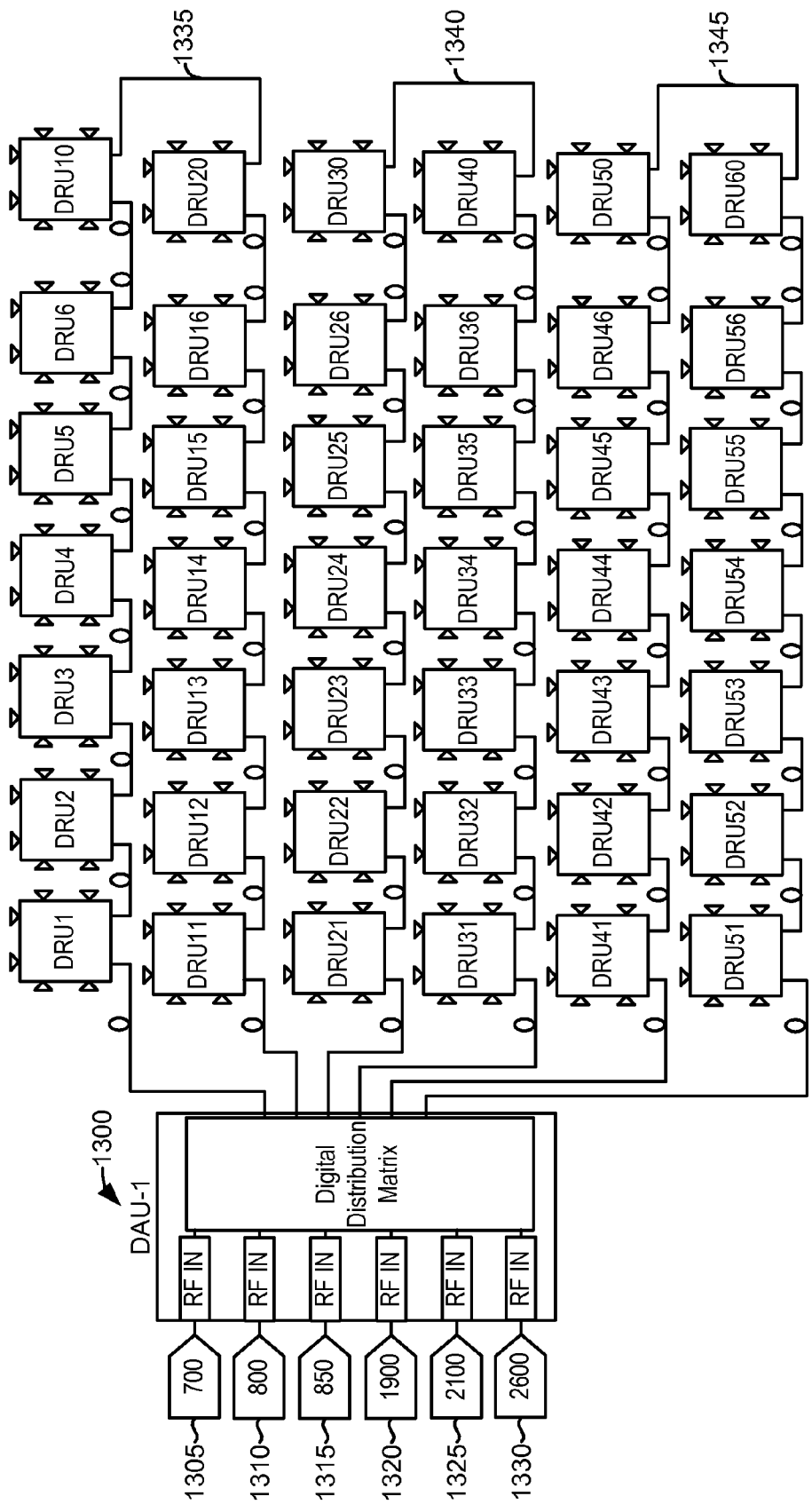
FIG. 13 illustrates an embodiment of a multi-band system employing six different services operating in different frequency channels with multiple DRUs according to the present invention.

Referring next to FIG. 13, a still further alternative embodiment may be better appreciated. The input frequency bands 1305-1330 (here denoted as six frequency bands at 700, 800, 850, 1900, 2100 and 2600 MHz) are input into the DAU 1300 from the BTS's (not shown). The DAU includes, among other functionalities discussed herein, an RF IN portion for each band, and a digital distribution matrix for distributing the frequency bands to a plurality of DRU's, indicated as DRU1-DRU60, daisy-chained along three separate rings 1335, 1340 and 1345 for achieving the desired coverage. The frequency bands are transported to either all or a subset of DRUs. The particular number of frequency bands, DAU's, DRU's and rings is exemplary only, and can, in practice, be any number appropriate to the performance capabilities and needs of the network.

Figure 14:
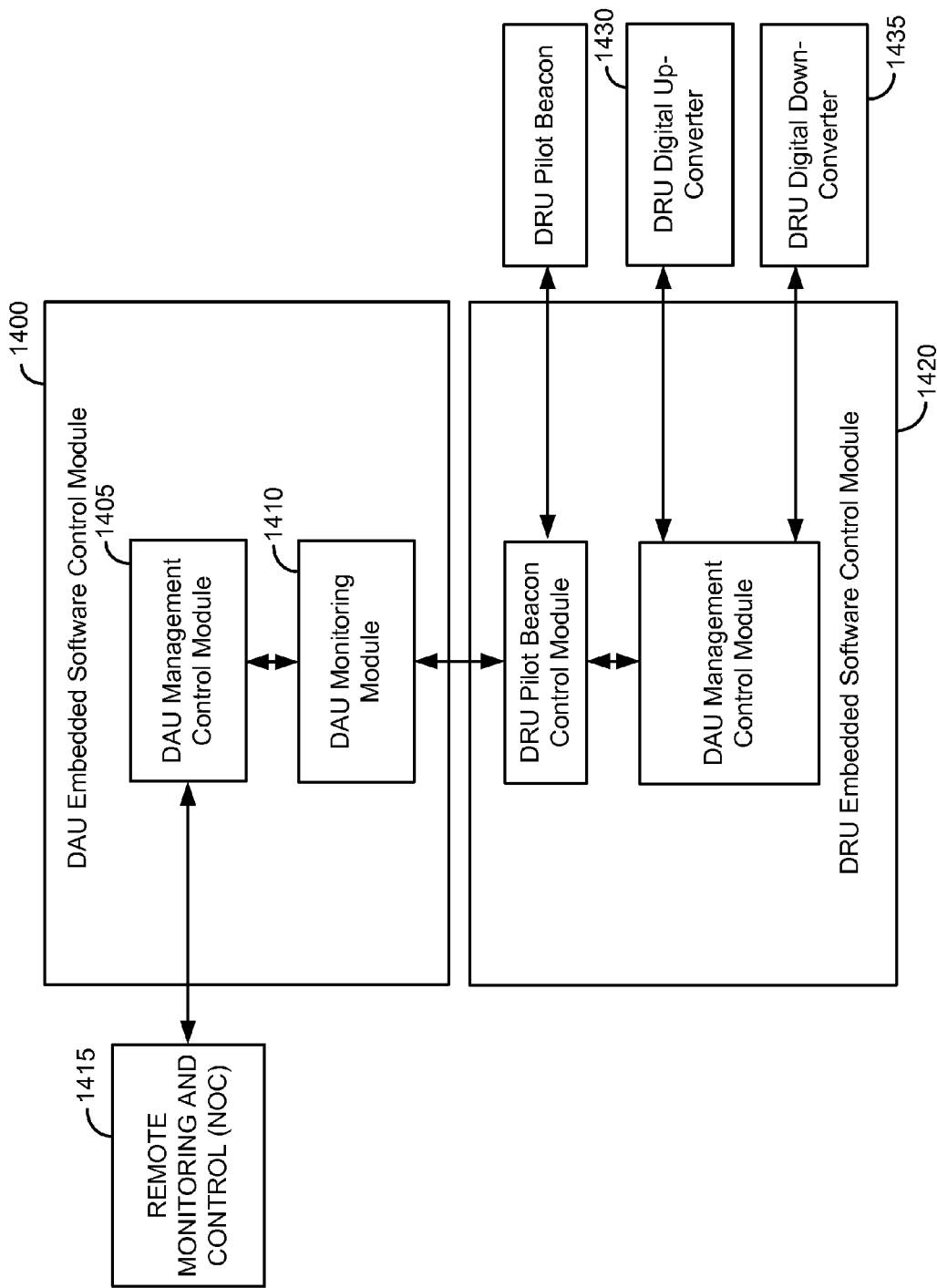
FIG. 14 illustrates in block diagram form the interaction between the DAU embedded software control module and the DRU embedded software control module.

Referring next to FIG. 14, the software embedded in the DAU and DRU, which controls the operation of keys functions of these devices, can be better understood. In particular, the DAU embedded software control module 1400 comprises a DAU Management Control Module 1405 and a DAU monitoring module 1410. The DAU Management Control Module 1405 communicates with the NOC 1415, and also the DAU monitoring module 1410. One such key function is determining and/or setting the appropriate amount of radio resources (such as RF carriers, CDMA codes or TDMA time slots) assigned to a particular DRU or group of DRUs to meet desired capacity and throughput objectives. As noted previously, the NOC 1415 monitors the DAS operation and sends commands to the DAU's for configuring various functions of the DRU's as well as the DAU, in at least some embodiments.

The DAU Monitoring module, in addition to other functions, detects which carriers and corresponding time slots are active for each DRU. The DAU Management Control module communicates with the DRU Embedded Software Control module 1420 over a fiber optic link control channel via a control protocol. In an embodiment, the control protocol comprises headers together with packets of data, such that both control information and data are transmitted to the DRU's together as a message. DRU functions or features that the header would control in the DRU are typically implementation specific and can include, among other things, measuring uplink and downlink power, measuring gain of uplink and downlink, and monitoring alarms in the DRU.

In turn, the DRU Management Control module 1425 within the DRU Embedded Software Control Module sets the individual parameters of all the DRU Digital Up-Converters 1430 to enable or disable specific radio resources from being transmitted by a particular DRU or group of DRUs, and also sets the individual parameters of all the DRU Digital Down-Converters 1435 to enable or disable specific radio resources from being transmitted by a particular DRU or group of DRUs. In addition, the DRU Embedded Software Control Module comprises a DRU Pilot Beacon Control Module 1440, which communicates with a DRU Pilot Beacon 1445.

Referring next to FIG. 15, an embodiment of a daisy-chained configuration of DAU's is illustrated, together with a daisy-chained configuration of DRU's. In an embodiment, a plurality of base stations 1500A-1500n are each associated with one of DAU's 1505A-n. The DAU's are daisy-chained, and each DAU communicates with one or more daisy-chains 1510A-1510m of DRU's which may or may not be arranged in a ring configuration. It will be appreciated that the DAU's can also be configured in a ring configuration, as discussed above.

An algorithm operating within the DAU Monitoring module which detects which carriers and corresponding time slots for each carrier are active for each DRU provides information to the DAU Management Control module to help identify when, e.g., a particular downlink carrier is loaded by a percentage greater than a predetermined threshold whose value is communicated to the DAU Management Control module by the DAU's Remote Monitoring and Control function 1415. If that occurs, the DAU Management Control module can adaptively modify the system configuration to begin to deploy, typically although not necessarily slowly, additional radio resources (such as RF carriers, CDMA codes or TDMA time slots) for use by a particular DRU which need those radio resources within its coverage area. At the same time, usually the DAU Management Control module adaptively modifies the system configuration to begin to remove, again typically slowly, certain radio resources (such as RF carriers, CDMA codes or TDMA time slots) for use by a particular DRU where that DRU no longer needs those radio resources within its coverage area.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A network comprising:
a first digital access unit (DAU) coupled to a first radio frequency (RF) output of a first base transceiver station (BTS) and configured to receive a first RF signal from the first BTS via a first RF input port, wherein the first RF signal includes a first plurality of carriers, wherein the first BTS has first capacity resources;
a second DAU coupled to a second RF output of a second BTS separately located from the first BTS, wherein the second DAU is configured to receive a second RF signal from the second BTS via a second RF input port, wherein the second RF signal includes a second plurality of carriers, wherein the second BTS has second capacity resources;
a first digital remote unit (DRU) coupled to the first DAU and the second DAU and configured to broadcast to mobile subscribers one or more of the first plurality of carriers and one or more of the second plurality of carriers using the first capacity resources; and
a second DRU coupled to the first DAU and the second DAU and configured to broadcast to mobile subscribers one or more of the first plurality of carriers and one or more of the second plurality of carriers using the second capacity resources,
wherein the first DRU is coupled to the second DRU, wherein the first DAU is configured to route the first RF signal and the second RF signal to the first DRU, wherein the first DRU is configured to form an RF output signal including at least some of the first plurality of carriers and at least some of the second plurality of carriers, and wherein the first capacity resources and the second capacity resources are variable and shared between the first DRU and the second DRU.

2. The network of claim 1 wherein the first BTS is associated with a first infrastructure supplier and the second BTS is associated with a second infrastructure supplier.

3. The network of claim 2 wherein the first infrastructure supplier and the second infrastructure supplier are a same infrastructure supplier.

4. The network of claim 1 wherein the first BTS and the second BTS provide the first RF signal including the first plurality of carriers and the second RF signal including the second plurality of carriers, respectively using differing broadcast protocols.

5. The network of claim 4 wherein the differing broadcast protocols comprise at least one of CDMA, LTE or WCDMA.

6. The network of claim 1 wherein the first DAU and the second DAU are coupled via at least one of Ethernet cable, Optical Fiber, Microwave Line of Sight Link, Wireless Link, or Satellite Link.

7. The network of claim 6 wherein the first DAU and the second DAU are coupled to the first DRU and the second DRU via at least one of Ethernet cable, Optical Fiber, Microwave Line of Sight Link, Wireless Link, or Satellite Link.

8. The network of claim 1 wherein the first DRU and the second DRU are connected in a daisy chain configuration.

9. The network of claim 1 wherein the first DRU and the second DRU are connected to the first DAU and the second DAU in a star configuration.

10. The network of claim 1 wherein each of the first DAU and the second DAU are coupled to at least one of the first BTS or the second BTS via at least one of a Ethernet cable, Optical Fiber, Microwave Line of Sight Link, Wireless Link, or Satellite Link.

11. A method of operating a virtual distributed antenna system (DAS) network, the method comprising:
receiving, a first radio frequency (RF) signal including a first plurality of carriers from a first RF output of a first base transceiver station (BTS), wherein the first BTS has first capacity resources;
routing the first RF signal to a first RF input port of a first digital access unit (DAU) coupled to the first BTS;
receiving a second RF signal including a second plurality of carriers from a second RF output of a second BTS, wherein the second BTS has second capacity resources;
routing the second RF signal to a second RF input port of a second digital access unit (DAU) coupled to the second BTS;
routing, by the first DAU, the first RF signal and the second RF signal to a first digital remote unit (DRU) coupled to the first DAU and the second DAU, wherein the first DRU is configured to broadcast to mobile subscribers a first RF output signal including one or more of the first plurality of carriers and one or more of the second plurality of carriers using the first capacity resources;
routing, by the second DAU, the first RF signal and the second RF signal to a second DRU coupled to the first DAU and the second DAU, wherein the second DRU is configured to broadcast to mobile subscribers a second RF output signal including one or more of the first plurality of carriers and one or more of the second plurality of carriers using the second capacity resources,
wherein the first DRU is coupled to the second DRU, and wherein the first capacity resources and the second capacity resources are variable and shared between the first DRU and the second DRU.

12. The method of claim 11 further comprising:
configuring the second DRU to form the second RF output signal using fewer carriers than included in the first RF output signal, based on a geographic usage pattern indicating less bandwidth demand at a coverage area of the second DRU than at a coverage area of the first DRU.

13. The method of claim 11 wherein the first BTS is associated with a first infrastructure supplier and the second BTS is associated with a second infrastructure supplier.

14. The method of claim 13 wherein the first infrastructure supplier and the second infrastructure supplier are a same infrastructure supplier.

15. A method of operating a virtual distributed antenna system (DAS) network, the method comprising:
receiving a first radio frequency (RF) signal including a first plurality of carriers from a first RF output of a first base transceiver station (BTS), wherein the first BTS has first capacity resources;
routing the first RF signal to a first RF input port of a first digital access unit (DAU) coupled to the first BTS;
receiving a second RF signal including a second plurality of carriers from a second RF output of a second BTS, wherein the second BTS has second capacity resources;
routing the second RF signal to a second RF input port of a second digital access unit (DAU) coupled to the second BTS;

routing, through the first DAU, the first RF signal and the second RF signal to a first digital remote unit (DRU) coupled to the first DAU and the second DAU, wherein the first DRU is configured to broadcast to mobile subscribers a first RF output signal including a first subset of the first plurality of carriers and a first subset of the second plurality of carriers using the first capacity resources; and routing, through the second DAU, the first RF signal and the second RF signal to a second DRU coupled to the first DAU and the second DAU, wherein the second DRU is configured to broadcast to mobile subscribers a second RF output signal including a second subset of the first plurality of carriers and a second subset of the second plurality of carriers using the second capacity resources, wherein the first DRU is coupled to the second DRU, and wherein the first capacity resources and the second capacity resources are variable and shared between the first DRU and the second DRU.

16. The method of claim 15 further comprising:
repeatedly assigning the first DRU to one of a plurality of BTSs, the plurality of BTSs including the first BTS and the second BTS.

17. The method of claim 16 wherein the first DRU is assigned at least partly in an attempt to evenly distribute combined BTS resources across DRUs in the network.

18. The method of claim 15 wherein the first BTS is associated with a first infrastructure supplier and the second BTS is associated with a second infrastructure supplier.

19. The method of claim 18 wherein the first infrastructure supplier and the second infrastructure supplier are a same infrastructure supplier.

20. The network of claim 1, wherein the first DRU is indirectly coupled to the second DAU through the first DAU.

* * * * *